United States Patent
Chen et al.

(10) Patent No.: US 12,549,097 B2
(45) Date of Patent: Feb. 10, 2026

(54) RESONANT CONVERTER, CONTROL METHOD OF RESONANT CONVERTER, AND RELATED DEVICE

(71) Applicant: Huawei Digital Power Technologies Co., Ltd., Shenzhen (CN)

(72) Inventors: Bing Chen, Shenzhen (CN); Hong Tuo, Dongguan (CN); Yi Cai, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 296 days.

(21) Appl. No.: 18/489,971

(22) Filed: Oct. 19, 2023

(65) Prior Publication Data
US 2024/0136922 A1 Apr. 25, 2024
US 2024/0235386 A9 Jul. 11, 2024

(30) Foreign Application Priority Data
Oct. 20, 2022 (CN) .......................... 202211283946.4

(51) Int. Cl.
*H02M 3/00* (2006.01)
*H02M 1/00* (2006.01)
(Continued)

(52) U.S. Cl.
CPC ........... *H02M 3/01* (2021.05); *H02M 1/0077* (2021.05); *H02M 3/1563* (2013.01);
(Continued)

(58) Field of Classification Search
CPC ...... H02M 3/01; H02M 3/015; H02M 3/3376; H02M 1/4241
See application file for complete search history.

(56) References Cited

U.S. PATENT DOCUMENTS

| | | | |
|---|---|---|---|
| 10,581,319 B1 * | 3/2020 | Lin | H02M 3/33553 |
| 2009/0218994 A1 * | 9/2009 | Liu | H02M 3/01 |
| | | | 323/234 |
| 2019/0356230 A1 * | 11/2019 | Yeh | H02M 1/08 |

FOREIGN PATENT DOCUMENTS

| | | |
|---|---|---|
| CN | 103795252 A | 5/2014 |
| CN | 106612073 B | 10/2018 |
| KR | 102016429 B1 | 8/2019 |

OTHER PUBLICATIONS

IEC 61851-23, "Electric Vehicle Conductive Charging System—Part 23: DC Electric Vehicle Charging Station", International Standard, International Electrotechnical Commission (IEC), 2014, Mar. 2014, Edition 1.0, 78 pages.

(Continued)

*Primary Examiner* — Gary A Nash
(74) *Attorney, Agent, or Firm* — Maier & Maier, PLLC

(57) ABSTRACT

A resonant converter, a control method of a resonant converter, and a related device. The resonant converter includes a control circuit, a drive circuit, and a switch circuit. The control circuit is configured to generate, based on a target output electrical parameter of the resonant converter, a first pulse signal and a second pulse signal that have different frequencies. The control circuit is further configured to: obtain a first drive signal based on the first pulse signal and the second pulse signal and send the first drive signal to the drive circuit. The drive circuit is configured to: convert the first drive signal into one or more second drive signals and send the one or more second drive signals to the switch circuit, to turn on or off a switch component in the switch circuit.

20 Claims, 8 Drawing Sheets

(51) Int. Cl.
    *H02M 1/42*       (2007.01)
    *H02M 3/156*     (2006.01)
    *H02M 3/337*     (2006.01)
    *H02M 3/338*     (2006.01)
    *H02M 7/217*     (2006.01)

(52) U.S. Cl.
    CPC ......... *H02M 3/338* (2013.01); *H02M 7/2176* (2013.01); *H02M 1/4241* (2013.01); *H02M 3/015* (2021.05); *H02M 3/3376* (2013.01)

(56) References Cited

OTHER PUBLICATIONS

NB/T 33001-2018, "Specification for Electric Vehicle Off-Board Conductive Charger", Energy Industry Standard of the People's Republic of China, Apr. 3, 2018, 45 pages.

Zhu et al., "Control Strategy of Half-Bridge Three-Level LLC Resonant Converters With Wide Output Voltage Range", IEEE Transactions on Plasma Science, IEEE, Nov. 1, 2022, vol. 50, No. 11, 6 pages.

\* cited by examiner

RESONANT CONVERTER, CONTROL METHOD OF RESONANT CONVERTER, AND RELATED DEVICE

CROSS-REFERENCE TO RELATED APPLICATIONS

This application claims priority to Chinese Patent Application No. 202211283946.4, filed on Oct. 20, 2022, which is hereby incorporated by reference in its entirety.

TECHNICAL FIELD

The embodiments relate to the field of electronic technologies, a resonant converter, a control method of a resonant converter, and a related device.

BACKGROUND

With the continuous development of power conversion technologies, high efficiency and high power density have become an important development trend. Resonant converters are widely used in the field of power conversion technologies due to their advantages such as soft switching, high efficiency, and small sizes. The resonant converter may include a switch circuit, a resonant circuit, a rectifier circuit, and the like, and can provide a voltage-adjustable direct current output. Resonant converters are classified into a plurality of types based on different topologies of resonant circuits, for example, a common parallel inductor-inductor-capacitor (LLC) resonant converter and a series LLC resonant converter.

In a conventional technology, a magnitude of an output voltage of a resonant converter (or a gain of the resonant converter) may be adjusted by changing a frequency and/or a duty cycle of a drive signal used by a switch circuit. However, due to impact of factors such as a clock frequency, an interrupt processing time, and a loop control policy of a controller in the resonant converter, adjustable ranges for the frequency and the duty cycle of the drive signal are limited to some extent. Therefore, an existing control manner of the resonant converter causes a limited adjustable range for a gain of the resonant converter, and it is difficult to meet a requirement for a low output ripple under a light-load or almost-no-load working condition.

SUMMARY

To resolve the foregoing problem, the embodiments provide a resonant converter, a control method of a resonant converter, and a related device. A gain adjustable range of the resonant converter is relatively large, and the resonant converter can achieve a small gain in a light-load or almost-no-load working condition and can implement a relatively low output ripple.

According to a first aspect, an embodiment provides a resonant converter. The resonant converter includes a control circuit, a drive circuit, and a switch circuit, and the control circuit is connected to the switch circuit through the drive circuit. The control circuit is configured to generate a first pulse signal and a second pulse signal based on a target output electrical parameter of the resonant converter. A frequency of the first pulse signal is greater than or equal to a frequency of the second pulse signal. The control circuit is further configured to: obtain a first drive signal based on the first pulse signal and the second pulse signal and send the first drive signal to the drive circuit. The drive circuit is configured to: convert the first drive signal into one or more second drive signals and send the one or more second drive signals to the switch circuit. The switch circuit is configured to turn on or off a switch component in the switch circuit based on the one or more second drive signals.

In the foregoing implementation, the resonant converter may generate, based on the target output electrical parameter by using the control circuit, the first pulse signal and the second pulse signal that have frequencies and duty cycles, obtain, based on the first pulse signal and the second pulse signal, the first drive signal that is to be output to the drive circuit, and further drive, based on the first drive signal by using the drive circuit, the switch component in the switch circuit to be turned on or off. Because the first drive signal is determined and obtained by using the first pulse signal and the second pulse signal, adjustable ranges for a frequency and a duty cycle of the first drive signal are relatively large. The first drive signal is used to drive a switching transistor in the switch circuit to be turned on or off, so that a gain adjustable range of the resonant converter is relatively large. In this way, a gain of the resonant converter can be adjusted to a very small value under a light-load or almost-no-load working condition, so that the resonant converter has a relatively low output ripple. Therefore, the resonant converter has relatively strong applicability and practicability.

With reference to the first aspect, in an implementation, the control circuit is configured to perform an AND operation on the first pulse signal and the second pulse signal to obtain a first drive signal.

With reference to the first aspect, in an implementation, the resonant converter further includes an output sampling circuit, and the output sampling circuit is connected to the control circuit. The control circuit is configured to: obtain an output sampled electrical parameter of the resonant converter provided by the output sampling circuit; modulate, based on the output sampled electrical parameter of the resonant converter and the target output electrical parameter, one or more of the following: the frequency of the first pulse signal, the frequency of the second pulse signal, a duty cycle of the first pulse signal, and a duty cycle of the second pulse signal; obtain a new first drive signal based on a modulated first pulse signal and a modulated second pulse signal, and send the new first drive signal to the drive circuit; and obtain a new output sampled electrical parameter of the resonant converter provided by the output sampling circuit.

In the foregoing implementation, the control circuit may modulate, based on the output sampled electrical parameter of the resonant converter provided by the output sampling circuit, one or more of the following: the frequency of the first pulse signal, the frequency of the second pulse signal, the duty cycle of the first pulse signal, and the duty cycle of the second pulse signal, to indirectly perform feedback and adjustment on a turn-on frequency and turn-on duration of the switch component in the switch circuit. In this way, an actual output electrical parameter of the resonant converter can gradually become consistent with a preset target output electrical parameter, so as to achieve a stable state. In addition, because one or more of the following: the frequency of the first pulse signal, the frequency of the second pulse signal, the duty cycle of the first pulse signal, and the duty cycle of the second pulse signal are modulated to indirectly control the turn-on frequency and the turn-on duration of the switch component in the switch circuit, a gain adjustable range of the resonant converter may be relatively large, so that the resonant converter has a small gain under a light-load or almost-no-load working condition, and can implement a relatively low output ripple.

With reference to the first aspect, in an implementation, the control circuit is configured to: determine that the output sampled electrical parameter of the resonant converter is greater than the target output electrical parameter and the frequency of the first pulse signal is less than a first preset frequency, increase the frequency of the first pulse signal and keep the duty cycle of the first pulse signal, the frequency of the second pulse signal, and the duty cycle of the second pulse signal unchanged, to obtain the modulated first pulse signal and the modulated second pulse signal.

With reference to the first aspect, in an implementation, the control circuit is configured to: determine that the output sampled electrical parameter of the resonant converter is greater than the target output electrical parameter and the frequency of the first pulse signal is greater than or equal to the first preset frequency, increase the frequency of the second pulse signal and keep the frequency of the first pulse signal, the duty cycle of the first pulse signal, and the duty cycle of the second pulse signal unchanged, or reduce the duty cycle of the second pulse signal and keep the frequency of the first pulse signal, the duty cycle of the first pulse signal, and the frequency of the second pulse signal unchanged, to obtain the modulated first pulse signal and the modulated second pulse signal.

With reference to the first aspect, in an implementation, the control circuit is configured to: determine that the output sampled electrical parameter of the resonant converter is less than the target output electrical parameter and the frequency of the first pulse signal is greater than a second preset frequency, reduce the frequency of the first pulse signal and keep the duty cycle of the first pulse signal, the frequency of the second pulse signal, and the duty cycle of the second pulse signal unchanged.

With reference to the first aspect, in an implementation, the control circuit is configured to: determine that the output sampled electrical parameter of the resonant converter is less than the target output electrical parameter and the frequency of the first pulse signal is less than or equal to the second preset frequency, reduce the frequency of the second pulse signal and keep the frequency of the first pulse signal, the duty cycle of the first pulse signal, and the duty cycle of the second pulse signal unchanged, or increase the duty cycle of the second pulse signal and keep the frequency of the first pulse signal, the duty cycle of the first pulse signal, and the frequency of the second pulse signal unchanged, to obtain the modulated first pulse signal and the modulated second pulse signal.

With reference to the first aspect, in an implementation, the control circuit is configured to: determine that the output sampled electrical parameter of the resonant converter is consistent with the target output electrical parameter, and keep the frequency of the first pulse signal, the duty cycle of the first pulse signal, the frequency of the second pulse signal, and the duty cycle of the second pulse signal unchanged.

In the foregoing implementation, when a gain of the resonant converter needs to be increased or reduced, the control circuit uses a policy of preferentially reducing the frequency of the first pulse signal, and further modulates the frequency and the duty cycle of the second pulse signal only when it is determined that the frequency of the first pulse signal reaches an adjustable limit. Such a manner is simple and reliable and a performance limitation of the control circuit is full considered, to avoid a case in which the first pulse signal and the second pulse signal cannot be accurately modulated due to the performance limitation of the control circuit and ensure continuity and monotonicity of gain adjustment of the resonant converter.

With reference to the first aspect, in an implementation, the resonant converter further includes a resonant circuit and a rectifier circuit, the resonant circuit is connected to the switch circuit and the rectifier circuit, and the rectifier circuit is connected to the control circuit through the output sampling circuit.

With reference to the first aspect, in an implementation, the control circuit includes a controller and an AND circuit. The controller is configured to generate the first pulse signal and the second pulse signal based on the target output electrical parameter of the resonant converter. The AND circuit is configured to perform an AND operation on the first pulse signal and the second pulse signal to obtain the first drive signal and send the first drive signal to the drive circuit.

With reference to the first aspect, in an implementation, the controller and the AND circuit are independent of each other, or the controller includes the AND circuit.

With reference to the first aspect, in an implementation, a gain of the resonant converter is directly proportional to the duty cycle of the first pulse signal and/or the duty cycle of the second pulse signal and is inversely proportional to the frequency of the first pulse signal and/or the frequency of the second pulse signal.

According to a second aspect, an embodiment provides a control method of a resonant converter. The method is applicable to the resonant converter provided in any one of the second aspect or the implementations of the second aspect. The method includes: generating a first pulse signal and a second pulse signal based on a target output electrical parameter of the resonant converter, where a frequency of the first pulse signal is greater than or equal to a frequency of the second pulse signal; and obtaining a first drive signal based on the first pulse signal and the second pulse signal, and controlling, based on the first drive signal, a switch component in a switch circuit of the resonant converter to be turned on or off.

In the foregoing implementation, the control circuit may generate, based on the target output electrical parameter preset by the resonant converter, the first pulse signal and the second pulse signal that have frequencies and duty cycles, then obtain the first drive signal based on the first pulse signal and the second pulse signal, and further drive, based on the first drive signal, the switch component in the switch circuit to be turned on or off. Because the first drive signal is determined and obtained by using the first pulse signal and the second pulse signal, adjustable ranges for a frequency and a duty cycle of the first drive signal are relatively large. Therefore, the first drive signal is used to drive a switching transistor in the switch circuit to be turned on or off, so that a gain adjustable range of the resonant converter is relatively large. Therefore, according to the control method of a resonant converter, the resonant converter can have a very small gain under a light-load or almost-no-load working condition, so that the resonant converter has a relatively low output ripple, and applicability and practicability of the resonant converter can be significantly improved.

With reference to the second aspect, in an implementation, an AND operation may be performed on the first pulse signal and the second pulse signal to obtain the first drive signal.

With reference to the second aspect, in an implementation, the resonant converter further includes an output sampling circuit. The method further includes: obtaining an output sampled electrical parameter of the resonant converter provided by the output sampling circuit; modulating, based on the output sampled electrical parameter of the resonant converter and the target output electrical parameter, one or more of the following: the frequency of the first pulse signal, the frequency of the second pulse signal, a duty cycle of the first pulse signal, and a duty cycle of the second pulse signal; and obtaining a new first drive signal based on a modulated first pulse signal and a modulated second pulse signal, and controlling, based on the new first drive signal, the switch component in the switch circuit of the resonant converter to be turned on or off.

In the foregoing implementation, the control circuit may modulate, based on the output sampled electrical parameter of the resonant converter provided by the output sampling circuit, one or more of the following: the frequency of the first pulse signal, the frequency of the second pulse signal, the duty cycle of the first pulse signal, and the duty cycle of the second pulse signal, to indirectly perform feedback and adjustment on a turn-on frequency and turn-on duration of the switch component in the switch circuit. In this way, an actual output electrical parameter of the resonant converter can gradually become consistent with the preset target output electrical parameter, so as to achieve a stable state.

With reference to the second aspect, in an implementation, the control circuit determines that the output sampled electrical parameter of the resonant converter is greater than the target output electrical parameter and the frequency of the first pulse signal is less than a first preset frequency, increases the frequency of the first pulse signal and keeps the duty cycle of the first pulse signal, the frequency of the second pulse signal, and the duty cycle of the second pulse signal unchanged.

With reference to the second aspect, in an implementation, the control circuit determines that the output sampled electrical parameter of the resonant converter is greater than the target output electrical parameter and the frequency of the first pulse signal is greater than or equal to the first preset frequency, increases the frequency of the second pulse signal and keeps the frequency of the first pulse signal, the duty cycle of the first pulse signal, and the duty cycle of the second pulse signal unchanged, or reduces the duty cycle of the second pulse signal and keeps the frequency of the first pulse signal, the duty cycle of the first pulse signal, and the frequency of the second pulse signal unchanged.

With reference to the second aspect, in an implementation, the control circuit determines that the output sampled electrical parameter of the resonant converter is less than the target output electrical parameter and the frequency of the first pulse signal is greater than a second preset frequency, reduces the frequency of the first pulse signal and keeps the duty cycle of the first pulse signal, the frequency of the second pulse signal, and the duty cycle of the second pulse signal unchanged.

With reference to the second aspect, in an implementation, the control circuit determines that the output sampled electrical parameter of the resonant converter is less than the target output electrical parameter and the frequency of the first pulse signal is less than or equal to the second preset frequency, reduces the frequency of the second pulse signal and keeps the frequency of the first pulse signal, the duty cycle of the first pulse signal, and the duty cycle of the second pulse signal unchanged, or increases the duty cycle of the second pulse signal and keeps the frequency of the first pulse signal, the duty cycle of the first pulse signal, and the frequency of the second pulse signal unchanged.

With reference to the second aspect, in an implementation, the control circuit determines that the output sampled electrical parameter of the resonant converter is consistent with the target output electrical parameter, and keeps the frequency of the first pulse signal, the duty cycle of the first pulse signal, the frequency of the second pulse signal, and the duty cycle of the second pulse signal unchanged.

In the foregoing implementation, when a gain of the resonant converter needs to be increased or reduced, the control circuit uses a policy of preferentially reducing the frequency of the first pulse signal, and further modulates the frequency and the duty cycle of the second pulse signal only when it is determined that the frequency of the first pulse signal reaches an adjustable limit. Such a control manner is simple and reliable and a performance limitation of the control circuit is full considered, to avoid a case in which the first pulse signal and the second pulse signal cannot be accurately modulated due to the performance limitation of the control circuit and ensure continuity and monotonicity of gain adjustment of the resonant converter.

With reference to the second aspect, in an implementation, a gain of the resonant converter is directly proportional to the duty cycle of the first pulse signal and/or the duty cycle of the second pulse signal and is inversely proportional to the frequency of the first pulse signal and/or the frequency of the second pulse signal.

With reference to the first aspect, in an implementation, the resonant converter includes a controller and an AND circuit. The control circuit may generate the first pulse signal and the second pulse signal based on the target output electrical parameter of the resonant converter by using the controller. The control circuit may further perform an AND operation on the first pulse signal and the second pulse signal by using the AND circuit, to obtain the first drive signal.

With reference to the second aspect, in an implementation, the controller and the AND circuit are independent of each other, or the controller includes the AND circuit.

With reference to the second aspect, in an implementation, the resonant converter further includes a drive circuit. The control circuit may send the first drive signal to the drive circuit, convert the first drive signal into one or more second drive signals by using the drive circuit, send the one or more second drive signals to the switch circuit, and control, by using the one or more second drive signals, the switch component in the switch circuit of the resonant converter to be turned on or off.

According to a third aspect, an embodiment provides a control circuit of a resonant converter. The control circuit is configured to generate a first pulse signal and a second pulse signal based on a target output electrical parameter of the resonant converter, where a frequency of the first pulse signal is greater than or equal to a frequency of the second pulse signal; and determine and obtain a first drive signal based on the first pulse signal and the second pulse signal, and control, based on the first drive signal, a switch component in a switch circuit of the resonant converter to be turned on or off.

With reference to the third aspect, in an implementation, the resonant converter further includes an output sampling circuit, the output sampling circuit is connected to the control circuit, and the control circuit is further configured to: obtain an output sampled electrical parameter of the resonant converter provided by the output sampling circuit; modulate, based on the output sampled electrical parameter of the resonant converter and the target output electrical parameter, one or more of the following: the frequency of the first pulse signal, the frequency of the second pulse signal, a duty cycle of the first pulse signal, and a duty cycle of the second pulse signal; obtain a new first drive signal based on a modulated first pulse signal and a modulated second pulse signal, and control, based on the new first drive signal, the switch component in the switch circuit of the resonant converter to be turned on or off; and obtain a new output sampled electrical parameter of the resonant converter provided by the output sampling circuit.

With reference to the third aspect, in an implementation, the control circuit is configured to: determine that the output sampled electrical parameter of the resonant converter is greater than the target output electrical parameter and the frequency of the first pulse signal is less than a first preset frequency, increase the frequency of the first pulse signal and keep the duty cycle of the first pulse signal, the frequency of the second pulse signal, and the duty cycle of the second pulse signal unchanged, to obtain the modulated first pulse signal and the modulated second pulse signal.

With reference to the third aspect, in an implementation, the control circuit is configured to: determine that the output sampled electrical parameter of the resonant converter is greater than the target output electrical parameter and the frequency of the first pulse signal is greater than or equal to the first preset frequency, increase the frequency of the second pulse signal and keep the frequency of the first pulse signal, the duty cycle of the first pulse signal, and the duty cycle of the second pulse signal unchanged, or reduce the duty cycle of the second pulse signal and keep the frequency of the first pulse signal, the duty cycle of the first pulse signal, and the frequency of the second pulse signal unchanged, to obtain the modulated first pulse signal and the modulated second pulse signal.

With reference to the third aspect, in an implementation, the control circuit is configured to: determine that the output sampled electrical parameter of the resonant converter is less than the target output electrical parameter and the frequency of the first pulse signal is greater than a second preset frequency, reduce the frequency of the first pulse signal and keep the duty cycle of the first pulse signal, the frequency of the second pulse signal, and the duty cycle of the second pulse signal unchanged, to obtain the modulated first pulse signal and the modulated second pulse signal.

With reference to the third aspect, in an implementation, the control circuit is configured to: determine that the output sampled electrical parameter of the resonant converter is less than the target output electrical parameter and the frequency of the first pulse signal is less than or equal to the second preset frequency, reduce the frequency of the second pulse signal and keep the frequency of the first pulse signal, the duty cycle of the first pulse signal, and the duty cycle of the second pulse signal unchanged, or increase the duty cycle of the second pulse signal and keep the frequency of the first pulse signal, the duty cycle of the first pulse signal, and the frequency of the second pulse signal unchanged, to obtain the modulated first pulse signal and the modulated second pulse signal.

With reference to the third aspect, in an implementation, the control circuit is configured to: determine that the output sampled electrical parameter of the resonant converter is consistent with the target output electrical parameter, and keep the frequency of the first pulse signal, the duty cycle of the first pulse signal, the frequency of the second pulse signal, and the duty cycle of the second pulse signal unchanged.

With reference to the third aspect, in an implementation, a gain of the resonant converter is directly proportional to the duty cycle of the first pulse signal and/or the duty cycle of the second pulse signal and is inversely proportional to the frequency of the first pulse signal and/or the frequency of the second pulse signal.

With reference to the third aspect, in an implementation, the control circuit includes a controller and an AND circuit. The controller is configured to generate the first pulse signal and the second pulse signal based on the target output electrical parameter of the resonant converter. The AND circuit is configured to perform an AND operation on the first pulse signal and the second pulse signal to obtain the first drive signal.

With reference to the third aspect, in an implementation, the controller and the AND circuit are independent of each other, or the controller includes the AND circuit.

According to a fourth aspect, an embodiment provides a power supply device. The power supply device includes a rectifier and the resonant converter provided in any one of the first aspect or the implementations of the first aspect. The rectifier is configured to: convert an alternating current externally connected to the power supply device into a first direct current and provide the first direct current to the resonant converter. The resonant converter is configured to: convert the first direct current into a target direct current and provide the target direct current to a load of the power supply device.

According to a fifth aspect, an embodiment provides a terminal device. The terminal device includes a battery and the resonant converter provided in any one of the first aspect or the implementations of the first aspect. The resonant converter is configured to charge the battery.

The solutions provided in the second aspect to the fifth aspect are used to implement or provide cooperation for implementing the resonant converter provided in any one of the first aspect or the optional manners of the first aspect. Therefore, the solutions can achieve a same or corresponding beneficial effect as the first aspect. Details are not described herein again.

In conclusion, according to embodiments, the resonant converter can have a very small gain under a light-load or almost-no-load working condition, so that the resonant converter has a relatively low output ripple, and applicability and practicability of the resonant converter can be significantly improved.

DETAILED DESCRIPTION OF THE EMBODIMENTS

The following clearly describes the embodiments with reference to the accompanying drawings.

An existing resonant converter performs gain adjustment by changing a frequency and/or a duty cycle of a drive signal used by a switch circuit. However, due to impact of factors such as a clock frequency, an interrupt processing time, and a loop control policy of a controller in the resonant converter, adjustable ranges for the frequency and the duty cycle of the drive signal are limited to some extent. As a result, an adjustable range for a gain of the drive signal is limited, and it is difficult to meet a requirement for a low output ripple under a light-load or almost-no-load working condition.

Therefore, a problem to be resolved is how to increase a gain adjustable range of a resonant converter, so that the resonant converter can implement a relatively low output ripple under a light-load or almost-no-load working condition, thereby improving applicability and practicability of the resonant converter.

To resolve the foregoing problem, the embodiments provide a resonant converter, a control method of a resonant converter, and a related device. According to the resonant converter, one drive signal may be obtained first based on two pulse signals having different frequencies, and a switch component in a switch circuit of the resonant converter is driven based on the drive signal to be turned on or off. Because the drive signal is obtained by combining the two pulse signals, a frequency and a duty cycle of the drive signal have relatively large adjustable ranges. Therefore, during actual operation, a gain of the resonant converter is adjusted by adjusting the frequency and/or the duty cycle of the drive signal, so that a gain adjustable range of the resonant converter is relatively large. In this way, a gain of the resonant converter can be adjusted to a very small value under a light-load or almost-no-load working condition, so that the resonant converter has a relatively low output ripple. Therefore, with the use of the resonant converter, a problem that it is difficult for an existing resonant converter to meet a requirement for a low output ripple under a light-load or almost-no-load working condition due to a limited gain adjustable range can be effectively resolved.

Figure 1:
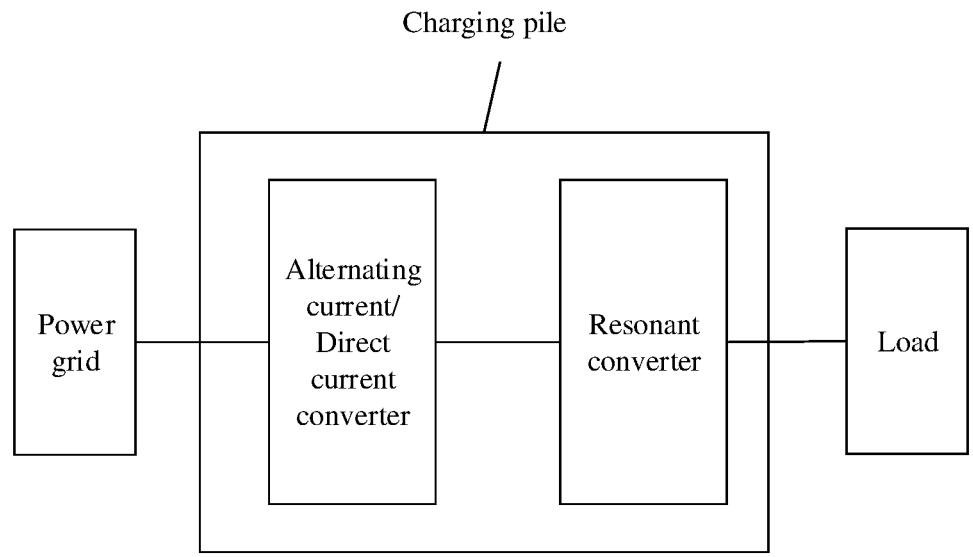
FIG. 1 is a schematic diagram of an scenario of a resonant converter.

The resonant converter is applicable to different scenarios, such as a charging pile charging scenario, a power supply scenario of a data center, and a power supply scenario of a communications base station. The charging pile charging scenario is used as an example below. FIG. 1 is a schematic diagram of a scenario of a resonant converter. As shown in FIG. 1, an entire power supply system includes a power grid, a charging pile, and a load. The charging pile includes an alternating current/direct current converter (such as an AC/DC converter) and the resonant converter. During actual operation, the charging pile obtains an alternating current from the power grid, converts the alternating current into a corresponding direct current by using the alternating current/direct current converter, and then provides the direct current to the resonant converter. The resonant converter may convert the direct current into a direct current having a voltage and provide the direct current having the voltage to the load, so that the load can work normally. It should be understood that, in the scenario shown in FIG. 1, the load may be an electric device such as an electric vehicle or an electric wheelchair. The charging pile uses the resonant converter. When the load has a small power or is disconnected (that is, in a light-load or no-load state), an output ripple of the charging pile is small, and reliability is relatively high.

It should be understood that the foregoing description of the scenario of the resonant converter is merely an example, and the resonant converter may be further applied to another different scenario. This is not limited.

Embodiment 1

The following describes in detail a structure and functions of a resonant converter with reference to FIG. 2 to FIG. 6.

Figure 2:
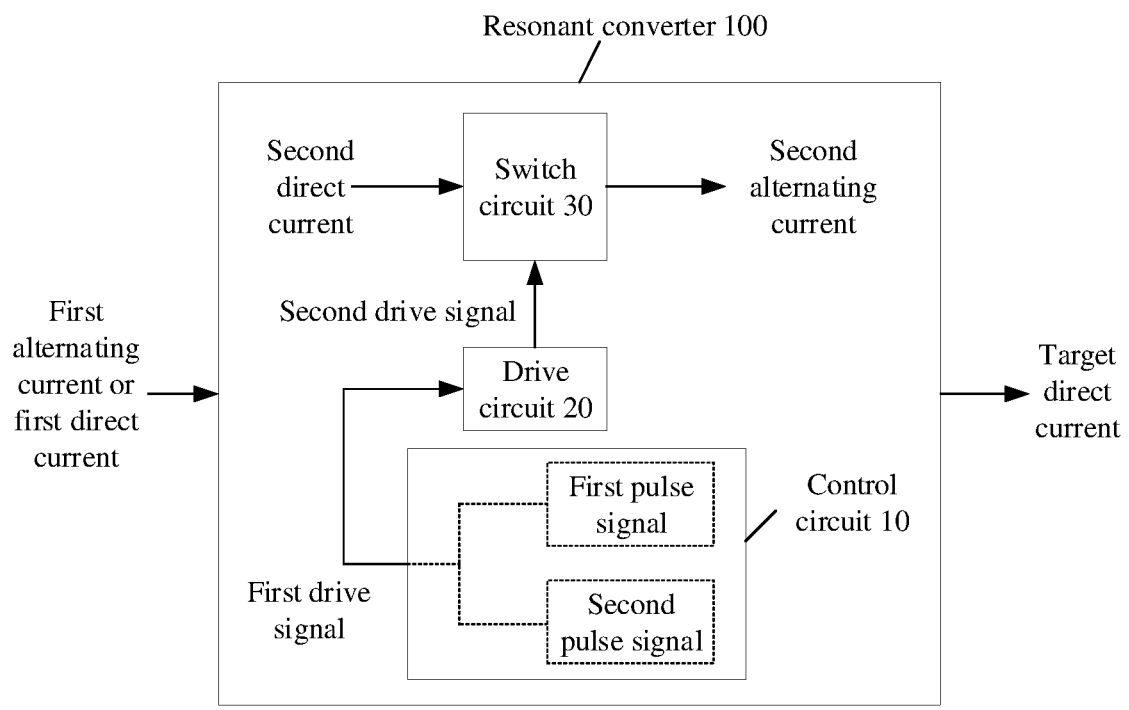
FIG. 2 is a schematic diagram of a structure of a resonant converter.

FIG. 2 is a schematic diagram of a structure of a resonant converter. As shown in FIG. 2, the resonant converter 100 may include a control circuit 10, a drive circuit 20, and a switch circuit 30. The control circuit 10 is connected to the switch circuit 30 through the drive circuit 20.

In this embodiment, the resonant converter 100 may be configured to: convert a received first alternating current or first direct current into a direct current that meets a target output electrical parameter (which is described as a target direct current instead) and output the direct current. It should be understood that the electrical parameter may be a voltage or a current, and the target output electrical parameter is an output voltage value or an output current value preset by the resonant converter 100. When the target output electrical parameter is a preset output voltage value, the target direct current is a direct current whose voltage value is the preset output voltage value. When the target output electrical parameter is a preset output current value, the target direct current is a direct current whose current value is the preset output current value. It should be understood that, before the resonant converter 100 reaches a steady state, an output of the resonant converter 100 is not the target direct current.

After the resonant converter 100 is powered on, the control circuit 10 may be configured to generate a first pulse signal and a second pulse signal based on the target output electrical parameter preset by the resonant converter 100. A frequency of the first pulse signal is greater than or equal to a frequency of the second pulse signal. The control circuit 10 may be further configured to obtain a first drive signal based on the first pulse signal and the second pulse signal and send the first drive signal to the drive circuit 20. After obtaining the target output electrical parameter, the control circuit 10 may be configured to determine, based on a fixed relationship between a switching frequency of the switch circuit 30 and an output parameter of the resonant converter 100, a switching frequency and a duty cycle that are needed by the switch circuit 30 and that correspond to the target output electrical parameter, that is, determine a frequency (which is assumed to be f1) and a duty cycle (which is assumed to be z1) of the first drive signal needed by a switch component in the switch circuit 30. The control circuit 10 is further configured to determine, based on the determined frequency f1 and duty cycle z1, frequencies and duty cycles of the first pulse signal and the second pulse signal through which the first drive signal can be obtained by using an AND operation. Herein, it is assumed that the frequency and the duty cycle of the first pulse signal are f11 and z11 respectively, and the frequency and the duty cycle of the second pulse signal are f21 and z21 respectively. Further, the control circuit 10 may generate a pulse signal whose frequency and duty cycle are f11 and z11 respectively and use the pulse signal as the first pulse signal. In addition, the control circuit 10 may further generate a pulse signal whose frequency and duty cycle are f21 and z21 respectively and use the pulse signal as the second pulse signal. It should be understood that the frequency f21 is less than or equal to the frequency f11. Then, the control circuit 10 may determine, based on the first pulse signal and the second pulse signal, the first drive signal whose frequency is f1 and duty cycle is z1, and send the first drive signal to the drive circuit 20.

The drive circuit 20 may be configured to: convert the received first drive signal into one or more second drive signals and send the one or more second drive signals to the switch circuit 30. It should be understood that the switch circuit 30 may include one or more switch components, and a control end of each of the one or more switch components is connected to the drive circuit 20. After converting the first drive signal into one or more second drive signals that can be used to directly control the one or more switch components to be turned on or off, the drive circuit 20 may directly send the one or more second drive signals to the control ends of the switch components. It should be noted that a quantity of second drive signals is determined by a quantity of switch components included in the switch circuit 30 and control manners of these switch components. This is not limited.

The switch circuit 30 is configured to turn on or turn off, based on the one or more second drive signals, the one or more switch components included in the switch circuit 30, to convert a second direct current provided by the resonant converter 100 into a second alternating current and output the second alternating current. It should be understood that the second direct current herein may be the first direct current described above or may be obtained by converting the first direct current or the first alternating current described above. This is not limited.

In the foregoing implementation, the resonant converter 100 may generate, based on the target output electrical parameter by using the control circuit 10, the first pulse signal and the second pulse signal that have frequencies and duty cycles, obtain, based on the first pulse signal and the second pulse signal, the first drive signal that is to be output to the drive circuit 20, and further drive, based on the first drive signal by using the drive circuit 20, the switch component in the switch circuit 30 to be turned on or off. Because the first drive signal is obtained by combining the first pulse signal and the second pulse signal, adjustable ranges for a frequency and a duty cycle of the first drive signal are relatively large. The first drive signal is used to drive a switching transistor in the switch circuit 30 to be turned on or off, so that a gain adjustable range of the resonant converter 100 is relatively large. In this way, a gain of the resonant converter 100 can be adjusted to a very small value under a light-load or almost-no-load working condition, so that the resonant converter 100 has a relatively low output ripple. Therefore, the resonant converter 100 has relatively strong applicability and practicability.

In some implementations, the control circuit 10 may be configured to perform an AND operation on the first drive signal and the second drive signal, and determine a signal obtained by performing an AND operation as the first drive signal. Herein, the first drive signal is determined based on the first drive signal and the second drive signal by using an AND operation. The method is simple and easy to implement and can improve working efficiency of the resonant converter 100. It should be understood that, in actual implementation, the control circuit 10 may alternatively determine the first drive signal based on the first drive signal and the second drive signal in another implementation. For example, the control circuit 10 may first obtain weights corresponding to the first drive signal and the second drive signal, and then perform an AND operation on the first drive signal and the second drive signal with reference to the weights corresponding to the first drive signal and the second drive signal, to obtain the first drive signal. A process in which the control circuit 10 determines the first drive signal based on the first drive signal and the second drive signal is not limited, provided that it can be ensured that the gain of the resonant converter 100 is directly proportional to the duty cycle of the first pulse signal and/or the duty cycle of the second pulse signal, and is inversely proportional to the frequency of the first pulse signal and/or the frequency of the second pulse signal.

Figure 3:
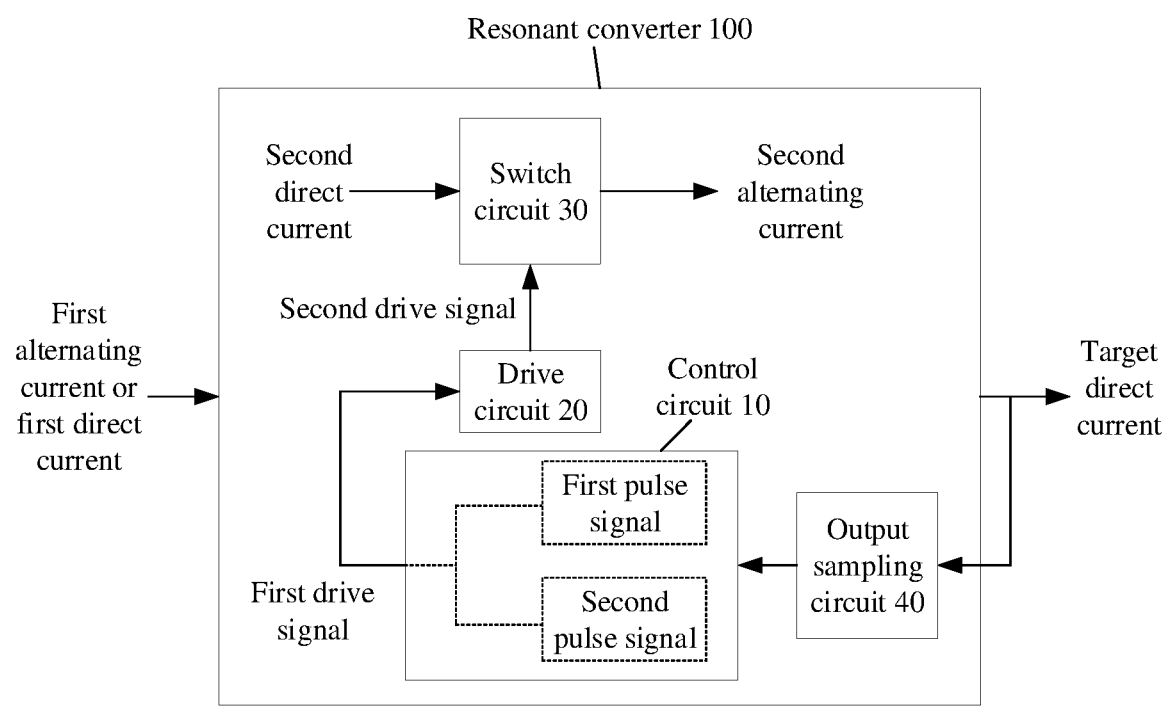
FIG. 3 is a schematic diagram of another structure of a resonant converter.

FIG. 3 is a schematic diagram of another structure of a resonant converter. As shown in FIG. 3, the resonant converter 100 may further include an output sampling circuit 40. One end of the output sampling circuit 40 is connected to the control circuit 10, and the other end is connected to an output end of the resonant converter 100.

During actual operation, the output sampling circuit 40 is configured to: perform detection on the output end of the resonant converter 100 to obtain an output sampled electrical parameter of the resonant converter 100, and send the output sampled electrical parameter obtained by the output sampling circuit 40 to the control circuit 10. It should be understood that, when the target output electrical parameter is a preset output voltage value, the output sampling circuit 40 is configured to detect an output voltage of the resonant converter 100 and send the detected voltage value as the output sampled electrical parameter of the resonant converter 100 to the control circuit 10. When the target output electrical parameter is a preset output current value, the output sampling circuit 40 is configured to detect an output current of the resonant converter 100 and send the detected current value as the output sampled electrical parameter of the resonant converter 100 to the control circuit 10.

The control circuit 10 is configured to: obtain an output sampled electrical parameter of the resonant converter 100 provided by the output sampling circuit 40; modulate, based on the output sampled electrical parameter of the resonant converter 100 and the target output electrical parameter, one or more of the following: the frequency of the first pulse signal, the frequency of the second pulse signal, a duty cycle of the first pulse signal, and a duty cycle of the second pulse signal, to obtain a modulated first pulse signal and a modulated second pulse signal; and then obtain a new first drive signal based on the modulated first pulse signal and the modulated second pulse signal, and send the new first drive signal to the drive circuit 20. The drive circuit 20 may be configured to generate one or more new second drive signals based on the new first drive signal and send the one or more new second drive signals to the switch circuit 30. The switch circuit 30 may be configured to turn on or turn off, by using the one or more new second drive signals, the one or more switch components included in the switch circuit 30.

It should be noted herein that, in actual implementation, to enable the output sampled electrical parameter of the resonant converter 100 to be consistent with the target output electrical parameter, the control circuit 10 may continuously obtain the output sampled electrical parameter of the resonant converter 100, and repeatedly perform the foregoing adjustment operation until the control circuit 10 determines that the output sampled electrical parameter of the resonant converter 100 is consistent with the target output electrical parameter. Because a process of each time of adjustment is similar, details are not described herein again.

In the foregoing implementation, the control circuit 10 may modulate, based on the output sampled electrical parameter of the resonant converter 100 provided by the output sampling circuit 40, one or more of the following: the frequency of the first pulse signal, the frequency of the second pulse signal, the duty cycle of the first pulse signal, and the duty cycle of the second pulse signal, to indirectly perform feedback and adjustment on a turn-on frequency and turn-on duration of the switch component in the switch circuit 30. In this way, an actual output electrical parameter of the resonant converter 100 can gradually become consistent with a preset target output electrical parameter, so as to achieve a stable state. In addition, because one or more of the following: the frequency of the first pulse signal, the frequency of the second pulse signal, the duty cycle of the first pulse signal, and the duty cycle of the second pulse signal are modulated to indirectly control the turn-on frequency and the turn-on duration of the switch component in the switch circuit 30, the gain adjustable range of the resonant converter 100 may be relatively large, so that the resonant converter 100 has a small gain under a light-load or almost-no-load working condition, and can implement a relatively low output ripple.

In an optional implementation, the control circuit 10 may perform an AND operation on the modulated first pulse signal and the modulated second pulse signal to obtain the new first drive signal.

In this embodiment, a frequency of the first drive signal is directly proportional to the frequency of the first pulse signal and/or the frequency of the second pulse signal, a duty cycle of the first drive signal is proportional to the duty cycle of the first pulse signal and/or the duty cycle of the second pulse signal, the gain of the resonant converter 100 is inversely proportional to the frequency of the first drive signal, and the gain of the resonant converter 100 is directly proportional to the duty cycle of the first drive signal. Therefore, the gain of the resonant converter 100 is directly proportional to the duty cycle of the first pulse signal and/or the duty cycle of the second pulse signal and is inversely proportional to the frequency of the first pulse signal and/or the frequency of the second pulse signal.

In a first optional implementation, the control circuit 10 may obtain the modulated first pulse signal and the modulated second pulse signal by adjusting only the frequency of the first pulse signal.

After obtaining the output sampled electrical parameter of the resonant converter 100, the control circuit 10 may compare the output sampled electrical parameter with the preset target output electrical parameter. If the control circuit 10 determines that the output sampled electrical parameter of the resonant converter 100 is less than the target output electrical parameter, it indicates that the gain of the resonant converter 100 needs to be increased. In this case, the control circuit 10 may reduce the frequency of the first pulse signal and keep the duty cycle of the first pulse signal, the frequency of the second pulse signal, and the duty cycle of the second pulse signal unchanged, to obtain the modulated first pulse signal and the modulated second pulse signal. Herein, because the frequency of the first pulse signal is reduced, a frequency of the new first drive signal obtained by combining the modulated first pulse signal and the modulated second pulse signal is less than the frequency of the original first drive signal. In this way, the gain of the resonant converter 100 may be increased, so that a new output sampled electrical parameter of the resonant converter 100 can be closer to the target output electrical parameter.

Further, if the control circuit 10 determines that the output sampled electrical parameter of the resonant converter 100 is greater than the target output electrical parameter, it indicates that the gain of the resonant converter 100 needs to be reduced. In this case, the control circuit 10 may increase the frequency of the first pulse signal and keep the duty cycle of the first pulse signal, the frequency of the second pulse signal, and the duty cycle of the second pulse signal unchanged, to obtain the modulated first pulse signal and the modulated second pulse signal. Herein, because the frequency of the first pulse signal is increased, a frequency of the new first drive signal obtained by combining the modulated first pulse signal and the modulated second pulse signal is greater than the frequency of the original first drive signal. In this way, the gain of the resonant converter 100 may be reduced, so that a new output sampled electrical parameter of the resonant converter 100 can be closer to the target output electrical parameter.

Further, if the control circuit 10 determines that the output sampled electrical parameter of the resonant converter 100 is consistent with the target output electrical parameter, it indicates that the gain of the resonant converter 100 does not need to be changed. In this case, the control circuit 10 may keep the frequency of the first pulse signal, the duty cycle of the first pulse signal, the frequency of the second pulse signal, and the duty cycle of the second pulse signal unchanged, to obtain the modulated first pulse signal and the modulated second pulse signal.

It should be additionally noted that, when the control circuit 10 determines that the output sampled electrical parameter of the resonant converter 100 is consistent with the target output electrical parameter, the control circuit 10 may obtain a new output sampled electrical parameter of the resonant converter 100, and repeatedly perform the foregoing determining and adjustment operations based on the new output sampled electrical parameter. Alternatively, the control circuit 10 may suspend obtaining the output sampled electrical parameter of the resonant converter 100 provided by the output sampling circuit 40, and detect, in real time, whether a preset trigger condition is met. If the control circuit detects that the preset trigger condition is met, the control circuit may start again to obtain an output sampled electrical parameter of the resonant converter 100 provided by the output sampling circuit 40. There are multiple preset trigger conditions, for example: a preset triggering time period arrives, or the target output electrical parameter of the resonant converter 100 is reconfigured. This is not limited.

It should be additionally noted that, in this embodiment, that the output sampled electrical parameter is consistent with the target output electrical parameter may mean that the difference between the output sampled electrical parameter and the target output electrical parameter is less than or equal to a first preset difference. That the output sampled electrical parameter is greater than the target output electrical parameter may mean that the output sampled electrical parameter is greater than the target output electrical parameter, and the difference between the output sampled electrical parameter and the target output electrical parameter is greater than the first preset difference. That the output sampled electrical parameter is less than the target output electrical parameter may mean that the output sampled electrical parameter is less than the target output electrical parameter, and the difference between the output sampled electrical parameter and the target output electrical parameter is greater than the first preset difference. The following is similar thereto, and details are not described again.

In a second optional implementation, the control circuit 10 may obtain the modulated first pulse signal and the modulated second pulse signal by adjusting only the duty cycle of the first pulse signal.

If the control circuit 10 determines that the output sampled electrical parameter of the resonant converter 100 is less than the target output electrical parameter after obtaining the output sampled electrical parameter of the resonant converter 100, it indicates that the gain of the resonant converter 100 needs to be increased. In this case, the control circuit 10 may increase the duty cycle of the first pulse signal and keep the frequency of the first pulse signal, the frequency of the second pulse signal, and the duty cycle of the second pulse signal unchanged, to obtain the modulated first pulse signal and the modulated second pulse signal. Herein, because the duty cycle of the first pulse signal is increased, a duty cycle of the new first drive signal obtained by combining the modulated first pulse signal and the modulated second pulse signal is greater than the duty cycle of the original first drive signal. In this way, the gain of the resonant converter 100 may be increased, so that a new output sampled electrical parameter of the resonant converter 100 can be closer to the target output electrical parameter.

Further, if the control circuit 10 determines that the output sampled electrical parameter of the resonant converter 100 is greater than the target output electrical parameter, it indicates that the gain of the resonant converter 100 needs to be reduced. In this case, the control circuit 10 may reduce the duty cycle of the first pulse signal and keep the duty cycle of the first pulse signal, the frequency of the second pulse signal, and the duty cycle of the second pulse signal unchanged, to obtain the modulated first pulse signal and the modulated second pulse signal. Herein, because the duty cycle of the first pulse signal is reduced, a duty cycle of the new first drive signal obtained by combining the modulated first pulse signal and the modulated second pulse signal is less than the duty cycle of the original first drive signal. In this way, the gain of the resonant converter 100 may be reduced, so that a new output sampled electrical parameter of the resonant converter 100 can be closer to the target output electrical parameter.

Further, if the control circuit 10 determines that the output sampled electrical parameter of the resonant converter 100 is consistent with the target output electrical parameter, it indicates that the gain of the resonant converter 100 does not need to be changed. In this case, the control circuit 10 may keep the frequency of the first pulse signal, the duty cycle of the first pulse signal, the frequency of the second pulse signal, and the duty cycle of the second pulse signal unchanged, to obtain the modulated first pulse signal and the modulated second pulse signal.

In a third optional implementation, the control circuit 10 may obtain the modulated first pulse signal and the modulated second pulse signal by adjusting only the duty cycle and the frequency of the first pulse signal.

If the control circuit 10 determines that the output sampled electrical parameter of the resonant converter 100 is less than the target output electrical parameter after obtaining the output sampled electrical parameter of the resonant converter 100, it indicates that the gain of the resonant converter 100 needs to be increased. In this case, the control circuit 10 may increase the duty cycle of the first pulse signal, reduce the frequency of the first pulse signal, and keep the frequency of the second pulse signal and the duty cycle of the second pulse signal unchanged, to obtain the modulated first pulse signal and the modulated second pulse signal.

Further, if the control circuit 10 determines that the output sampled electrical parameter of the resonant converter 100 is greater than the target output electrical parameter, it indicates that the gain of the resonant converter 100 needs to be reduced. In this case, the control circuit 10 may reduce the duty cycle of the first pulse signal, increase the duty cycle of the first pulse signal, and keep the frequency of the second pulse signal and the duty cycle of the second pulse signal unchanged, to obtain the modulated first pulse signal and the modulated second pulse signal.

Further, if the control circuit 10 determines that the output sampled electrical parameter of the resonant converter 100 is consistent with the target output electrical parameter, it indicates that the gain of the resonant converter 100 does not need to be changed. In this case, the control circuit 10 may keep the frequency of the first pulse signal, the duty cycle of the first pulse signal, the frequency of the second pulse signal, and the duty cycle of the second pulse signal unchanged, to obtain the modulated first pulse signal and the modulated second pulse signal.

In a fourth optional implementation, the control circuit 10 may obtain the modulated first pulse signal and the modulated second pulse signal by adjusting only the frequency of the second pulse signal.

After obtaining the output sampled electrical parameter of the resonant converter 100, the control circuit 10 may compare the output sampled electrical parameter with the preset target output electrical parameter. If the control circuit 10 determines that the output sampled electrical parameter of the resonant converter 100 is less than the target output electrical parameter, it indicates that the gain of the resonant converter 100 needs to be increased. In this case, the control circuit 10 may reduce the frequency of the second pulse signal and keep the duty cycle of the second pulse signal, the frequency of the first pulse signal, and the duty cycle of the first pulse signal unchanged, to obtain the modulated first pulse signal and the modulated second pulse signal. Herein, because the frequency of the second pulse signal is reduced, a frequency of the new first drive signal obtained by combining the modulated first pulse signal and the modulated second pulse signal is less than the frequency of the original first drive signal. In this way, the gain of the resonant converter 100 may be increased, so that a new output sampled electrical parameter of the resonant converter 100 can be closer to the target output electrical parameter.

Further, if the control circuit 10 determines that the output sampled electrical parameter of the resonant converter 100 is greater than the target output electrical parameter, it indicates that the gain of the resonant converter 100 needs to be reduced. In this case, the control circuit 10 may increase the frequency of the second pulse signal and keep the duty cycle of the second pulse signal, the frequency of the first pulse signal, and the duty cycle of the first pulse signal unchanged, to obtain the modulated first pulse signal and the modulated second pulse signal. Herein, because the frequency of the second pulse signal is increased, a frequency of the new first drive signal obtained by combining the modulated first pulse signal and the modulated second pulse signal is greater than the frequency of the original first drive signal. In this way, the gain of the resonant converter 100 may be reduced, so that a new output sampled electrical parameter of the resonant converter 100 can be closer to the target output electrical parameter.

Further, if the control circuit 10 determines that the output sampled electrical parameter of the resonant converter 100 is consistent with the target output electrical parameter, it indicates that the gain of the resonant converter 100 does not need to be changed. In this case, the control circuit 10 may keep the frequency of the first pulse signal, the duty cycle of the first pulse signal, the frequency of the second pulse signal, and the duty cycle of the second pulse signal unchanged, to obtain the modulated first pulse signal and the modulated second pulse signal.

In a fifth optional implementation, the control circuit 10 may obtain the modulated first pulse signal and the modulated second pulse signal by adjusting only the duty cycle of the second pulse signal.

If the control circuit 10 determines that the output sampled electrical parameter of the resonant converter 100 is less than the target output electrical parameter after obtaining the output sampled electrical parameter of the resonant converter 100, it indicates that the gain of the resonant converter 100 needs to be increased. In this case, the control circuit 10 may increase the duty cycle of the second pulse signal and keep the frequency of the second pulse signal, the frequency of the first pulse signal, and the duty cycle of the first pulse signal unchanged, to obtain the modulated first pulse signal and the modulated second pulse signal. Herein, because the duty cycle of the second pulse signal is increased, a duty cycle of the new first drive signal obtained by combining the modulated first pulse signal and the modulated second pulse signal is greater than the duty cycle of the original first drive signal. In this way, the gain of the resonant converter 100 may be increased, so that a new output sampled electrical parameter of the resonant converter 100 can be closer to the target output electrical parameter.

Further, if the control circuit 10 determines that the output sampled electrical parameter of the resonant converter 100 is greater than the target output electrical parameter, it indicates that the gain of the resonant converter 100 needs to be reduced. In this case, the control circuit 10 may reduce the duty cycle of the second pulse signal and keep the duty cycle of the second pulse signal, the frequency of the first pulse signal, and the duty cycle of the first pulse signal unchanged, to obtain the modulated first pulse signal and the modulated second pulse signal. Herein, because the duty cycle of the second pulse signal is reduced, a duty cycle of the new first drive signal obtained by combining the modulated first pulse signal and the modulated second pulse signal is less than the duty cycle of the original first drive signal. In this way, the gain of the resonant converter 100 may be reduced, so that a new output sampled electrical parameter of the resonant converter 100 can be closer to the target output electrical parameter.

Further, if the control circuit 10 determines that the output sampled electrical parameter of the resonant converter 100 is consistent with the target output electrical parameter, it indicates that the gain of the resonant converter 100 does not need to be changed. In this case, the control circuit 10 may keep the frequency of the first pulse signal, the duty cycle of the first pulse signal, the frequency of the second pulse signal, and the duty cycle of the second pulse signal unchanged, to obtain the modulated first pulse signal and the modulated second pulse signal.

In a sixth optional implementation, the control circuit 10 may obtain the modulated first pulse signal and the modulated second pulse signal by adjusting only the duty cycle and the frequency of the second pulse signal.

If the control circuit 10 determines that the output sampled electrical parameter of the resonant converter 100 is less than the target output electrical parameter after obtaining the output sampled electrical parameter of the resonant converter 100, it indicates that the gain of the resonant converter 100 needs to be increased. In this case, the control circuit 10 may increase the duty cycle of the second pulse signal, reduce the frequency of the second pulse signal, and keep the frequency of the first pulse signal and the duty cycle of the first pulse signal unchanged, to obtain the modulated first pulse signal and the modulated second pulse signal.

Further, if the control circuit 10 determines that the output sampled electrical parameter of the resonant converter 100 is greater than the target output electrical parameter, it indicates that the gain of the resonant converter 100 needs to be reduced. In this case, the control circuit 10 may reduce the duty cycle of the second pulse signal, increase the duty cycle of the second pulse signal, and keep the frequency of the first pulse signal and the duty cycle of the first pulse signal unchanged, to obtain the modulated first pulse signal and the modulated second pulse signal.

Further, if the control circuit 10 determines that the output sampled electrical parameter of the resonant converter 100 is consistent with the target output electrical parameter, it indicates that the gain of the resonant converter 100 does not need to be changed. In this case, the control circuit 10 may keep the frequency of the first pulse signal, the duty cycle of the first pulse signal, the frequency of the second pulse signal, and the duty cycle of the second pulse signal unchanged, to obtain the modulated first pulse signal and the modulated second pulse signal.

In some optional implementations, the control circuit 10 may adjust the frequencies and/or the duty cycles of both the first pulse signal and the second pulse signal based on the output sampled electrical parameter of the resonant converter 100 and the target output electrical parameter, to obtain the modulated first pulse signal and the modulated second pulse signal. A modulation process is similar to that in the foregoing six optional implementations, and the only difference lies in different adjustment objects. To avoid repetition, details are not described herein again.

In an optional implementation, if the control circuit 10 determines that the output sampled electrical parameter of the resonant converter 100 is greater than the target output electrical parameter and further determines that the frequency of the first pulse signal is less than a first preset frequency after obtaining the output sampled electrical parameter of the resonant converter 100, the control circuit 10 may increase the frequency of the first pulse signal and keep the duty cycle of the first pulse signal, the frequency of the second pulse signal, and the duty cycle of the second pulse signal unchanged, to obtain the modulated first pulse signal and the modulated second pulse signal.

Further, if it is determined that the output sampled electrical parameter of the resonant converter 100 is greater than the target output electrical parameter and it is further determined that the frequency of the first pulse signal is greater than or equal to the first preset frequency, the control circuit 10 increases the frequency of the second pulse signal and keeps the frequency of the first pulse signal, the duty cycle of the first pulse signal, and the duty cycle of the second pulse signal unchanged, to obtain the modulated first pulse signal and the modulated second pulse signal. Alternatively, the control circuit 10 may reduce the duty cycle of the second pulse signal and keep the frequency of the first pulse signal, the duty cycle of the first pulse signal, and the frequency of the second pulse signal unchanged, to obtain the modulated first pulse signal and the modulated second pulse signal.

Further, if it is determined that the output sampled electrical parameter of the resonant converter 100 is less than the target output electrical parameter and it is further determined that the frequency of the first pulse signal is greater than a second preset frequency, the control circuit 10 may reduce the frequency of the first pulse signal and keep the duty cycle of the first pulse signal, the frequency of the second pulse signal, and the duty cycle of the second pulse signal unchanged, to obtain the modulated first pulse signal and the modulated second pulse signal.

Further, if it is determined that the output sampled electrical parameter of the resonant converter 100 is less than the target output electrical parameter and it is further determined that the frequency of the first pulse signal is less than or equal to the second preset frequency, the control circuit 10 may reduce the frequency of the second pulse signal and keep the frequency of the first pulse signal, the duty cycle of the first pulse signal, and the duty cycle of the second pulse signal unchanged, or increase the duty cycle of the second pulse signal and keep the frequency of the first pulse signal, the duty cycle of the first pulse signal, and the frequency of the second pulse signal unchanged, to obtain the modulated first pulse signal and the modulated second pulse signal.

Further, if it is determined that the output sampled electrical parameter of the resonant converter 100 is consistent with the target output electrical parameter, the control circuit 10 may keep the frequency of the first pulse signal, the duty cycle of the first pulse signal, the frequency of the second pulse signal, and the duty cycle of the second pulse signal unchanged.

It should be additionally noted that, in the foregoing implementation, that the output sampled electrical parameter is consistent with the target output electrical parameter may mean that the difference between the output sampled electrical parameter and the target output electrical parameter is less than or equal to a first preset difference. That the output sampled electrical parameter is greater than the target output electrical parameter may mean that the output sampled electrical parameter is greater than the target output electrical parameter, and the difference between the output sampled electrical parameter and the target output electrical parameter is greater than the first preset difference. That the output sampled electrical parameter is less than the target output electrical parameter may mean that the output sampled electrical parameter is less than the target output electrical parameter, and the difference between the output sampled electrical parameter and the target output electrical parameter is greater than the first preset difference. Similarly, that the frequency of the first pulse signal is less than the first preset frequency may mean that the frequency of the first pulse signal is less than the first preset frequency, and the difference between the frequency of the first pulse signal and the first preset frequency is greater than a second preset difference. That the frequency of the first pulse signal is greater than the first preset frequency may mean that the frequency of the first pulse signal is greater than the first preset frequency, and the difference between the frequency of the first pulse signal and the first preset frequency is greater than the second preset difference. That the frequency of the first pulse signal is equal to the first preset frequency may mean that the difference between the frequency of the first pulse signal and the first preset frequency is less than or equal to the second preset difference. Similarly, that the frequency of the first pulse signal is less than the second preset frequency may mean that the frequency of the first pulse signal is less than the second preset frequency, and the difference between the frequency of the first pulse signal and the first preset frequency is greater than a third preset difference. That the frequency of the first pulse signal is greater than the second preset frequency may mean that the frequency of the first pulse signal is greater than the second preset frequency, and the difference between the frequency of the first pulse signal and the first preset frequency is greater than the third preset difference. That the frequency of the first pulse signal is equal to the second preset frequency may mean that the difference between the frequency of the first pulse signal and the second preset frequency is less than or equal to the third preset difference.

In the foregoing implementation, when a gain of the resonant converter 100 needs to be increased or reduced, the control circuit 10 uses a policy of preferentially reducing the frequency of the first pulse signal, and further modulates the frequency and the duty cycle of the second pulse signal only when it is determined that the frequency of the first pulse signal reaches an adjustable limit. Such a manner is simple and reliable and a performance limitation of the control circuit 10 is full considered, to avoid a case in which the first pulse signal and the second pulse signal cannot be accurately modulated due to the performance limitation of the control circuit 10 and ensure continuity and monotonicity of gain adjustment of the resonant converter 100.

The following describes, with reference to examples, a process in which the control circuit 10 controls the switch circuit 30. It is assumed that the control circuit 10 generates a first pulse signal S11 and a second pulse signal S21 at a moment t1 based on a target output electrical parameter of the resonant converter 100, a frequency and a duty cycle of the first pulse signal S11 are f11 and z11 respectively, a frequency and a duty cycle of the second pulse signal S21 are f21 and z21 respectively, and the frequency f11 is greater than the frequency f21. Then, the control circuit 10 may be configured to: perform an AND operation based on the first pulse signal S11 and the second pulse signal S21 to obtain a first drive signal Q11 and send the first drive signal Q11 to the drive circuit 20. The drive circuit 20 may generate one or more second drive signals Q21 based on the first drive signal Q11 and send the one or more second drive signals Q21 to the switch circuit 30. Switch components in the switch circuit 30 may be turned on or off based on the one or more second drive signals Q21, so that the resonant converter 100 can work normally. Then, the control circuit 10 may obtain, at a moment t2 after the moment t1, an output sampled electrical parameter C1 of the resonant converter 100 that is at the moment t2 and that is obtained by the output sampling circuit 40 through sampling. If it is determined that the output sampling parameter C1 is greater than a preset target output electrical parameter C0 and the frequency f11 is less than a first preset frequency f01, the control circuit 10 may adjust the frequency of the first pulse signal from f11 to f12 and keep a duty cycle of the first pulse signal and the frequency and a duty cycle of the second pulse signal unchanged, to obtain a modulated first pulse signal S12 and a modulated second pulse signal S22. Herein, the frequency f11 is less than the frequency f12. Then, the control circuit 10 may perform an AND operation on the first pulse signal S12 and the second pulse signal S22 to obtain a new first drive signal Q12. A frequency of the first drive signal Q12 is greater than the frequency of the first drive signal Q11. Then, the drive circuit 20 may generate one or more new second drive signals Q22 based on the first drive signal Q12 and send the one or more new second drive signals Q22 to the switch circuit 30. Then, at a moment t3 at which the switch circuit 30 works normally based on the one or more new second drive signals Q22, the control circuit 10 again obtains an output sampled electrical parameter C2 of the resonant converter 100 that is obtained by the output sampling circuit 40 through sampling, and again controls a switching frequency and a turn-on time of the switch component in the switch circuit 30 with reference to the output sampled electrical parameter C2 and the target output electrical parameter C0. When the control circuit 10 determines that an output sampled electrical parameter Cx of the resonant converter 100 that is obtained at a moment by the output sampling circuit 40 through sampling is consistent with the target output electrical parameter C0, the control circuit may suspend the operation of obtaining the output sampled electrical parameter of the resonant converter 100 from the output sampling circuit 40, and detect whether a preset trigger condition is met, to determine whether the control circuit 10 needs to start again to obtain an output sampled electrical parameter of the resonant converter 100.

In some implementations, when the control circuit 10 determines that the resonant converter 100 is in a heavy-load working condition, the control circuit 10 may further adjust the second pulse signal to a continuous high-level signal, so that waveforms of the first drive signal and the first pulse signal are completely the same. In this way, the resonant converter 100 may become a resonant converter for gain control in a pulse-width modulation mode, thereby meeting a gain requirement in a heavy load working condition and obtaining a relatively good output ripple control effect.

Figure 4:
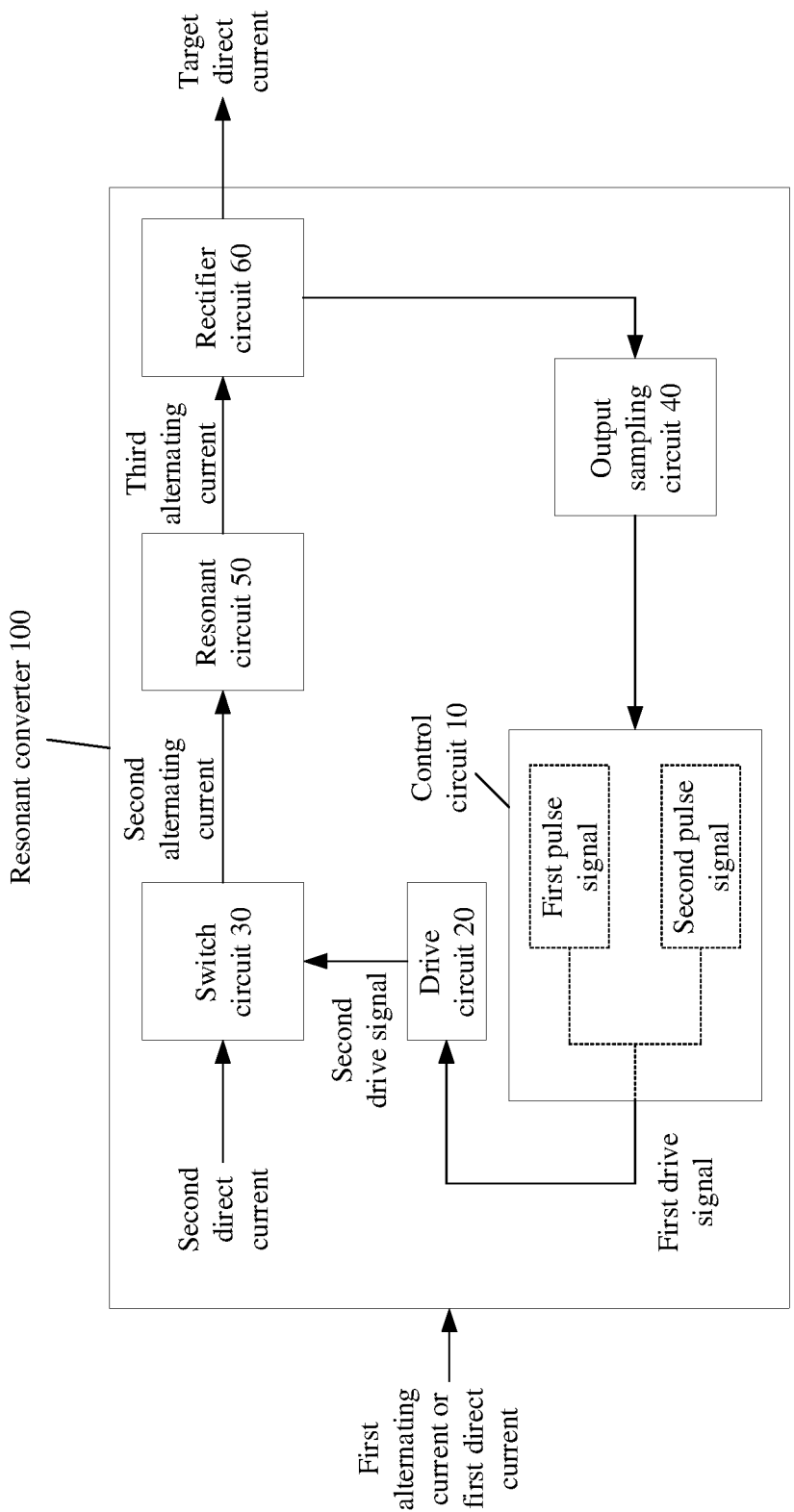
FIG. 4 is a schematic diagram of still another structure of a resonant converter.

FIG. 4 is a schematic diagram of still another structure of a resonant converter. As shown in FIG. 4, the resonant converter 100 may further include a resonant circuit 50 and a rectifier circuit 60. One end of the resonant circuit 50 is connected to the switch circuit 30, and the other end of the resonant circuit 50 is connected to one end of the rectifier circuit 60. The rectifier circuit 60 is further connected to the output sampling circuit 40. Alternatively, the resonant circuit 50 is connected to the switch circuit 30 and the rectifier circuit 60, and the rectifier circuit 60 is connected to the control circuit 10 through the output sampling circuit 40.

In actual operation, the resonant circuit 50 is configured to perform processing, such as tuning and filtering, on the second alternating current output by the switch circuit 30, to obtain a third alternating current, and output the third alternating current to the rectifier circuit 60. The rectifier circuit 60 is configured to rectify the third alternating current to obtain and output a target direct current. It should be understood that, before the resonant converter 100 reaches a steady state, a direct current output by the rectifier circuit 60 is not the target direct current.

Figure 5:
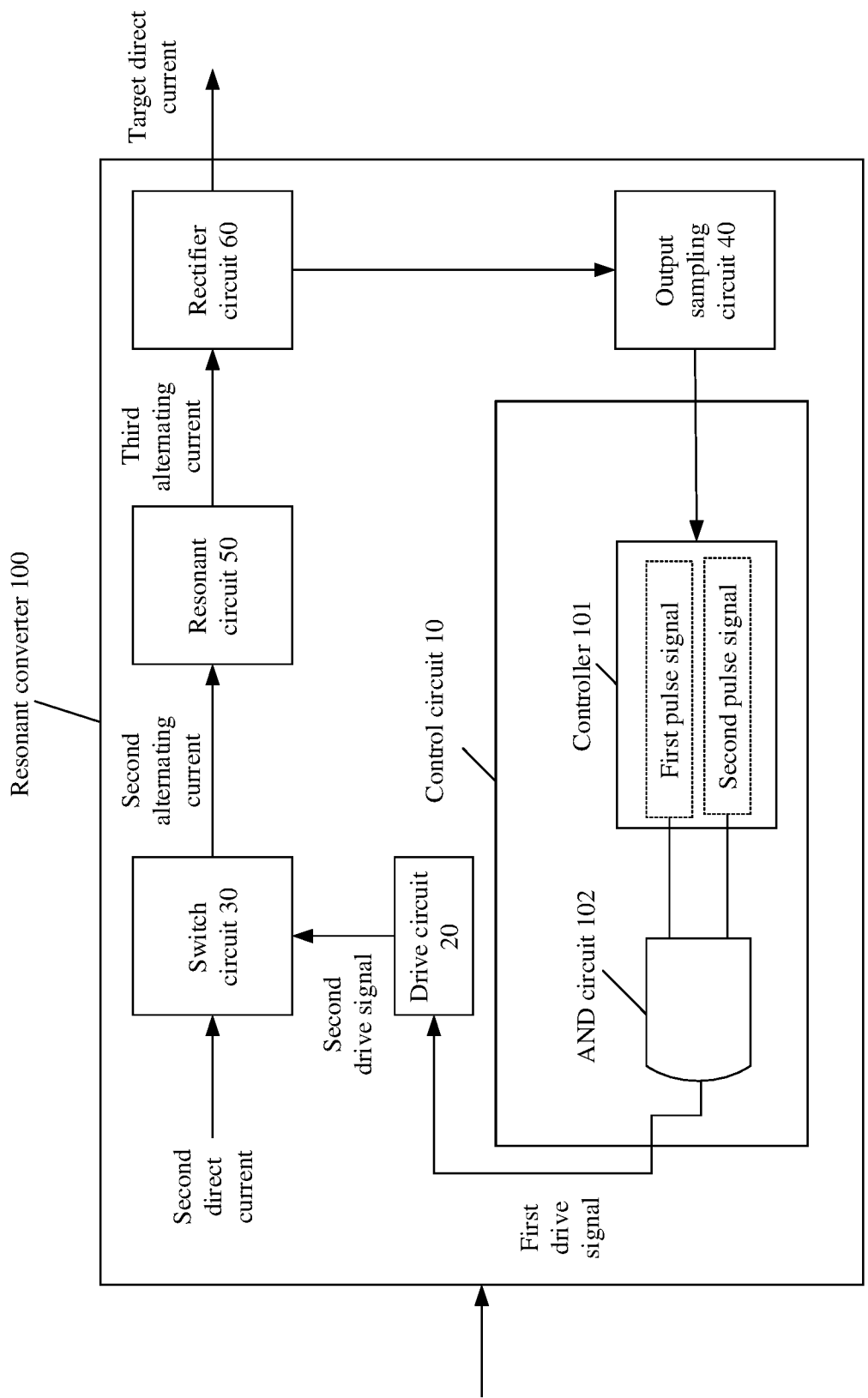
FIG. 5 is a schematic diagram of yet another structure of a resonant converter.

FIG. 5 is a schematic diagram of yet another structure of a resonant converter. As shown in FIG. 5, in a case in which the control circuit 10 obtains a first drive signal by performing an AND operation on a first pulse signal and a second pulse signal, the control circuit 10 may include a controller 101 and an AND circuit 102. The controller 101 is connected to an output sampling circuit 40 and the AND circuit 102, and the AND circuit 102 is further connected to a drive circuit 20.

In actual operation, the controller 101 may be configured to generate the first pulse signal and the second pulse signal based on a target output electrical parameter of the resonant converter 100. The AND circuit 102 may be configured to: perform an AND operation on the first pulse signal and the second pulse signal to obtain the first drive signal and send the first drive signal to the drive circuit 20.

Optionally, in actual implementation, as shown in FIG. 5, the controller 101 and the AND circuit 102 are independent of each other. That is, the controller 101 and the AND circuit 102 are two electrical components independent of each other.

Figure 6:
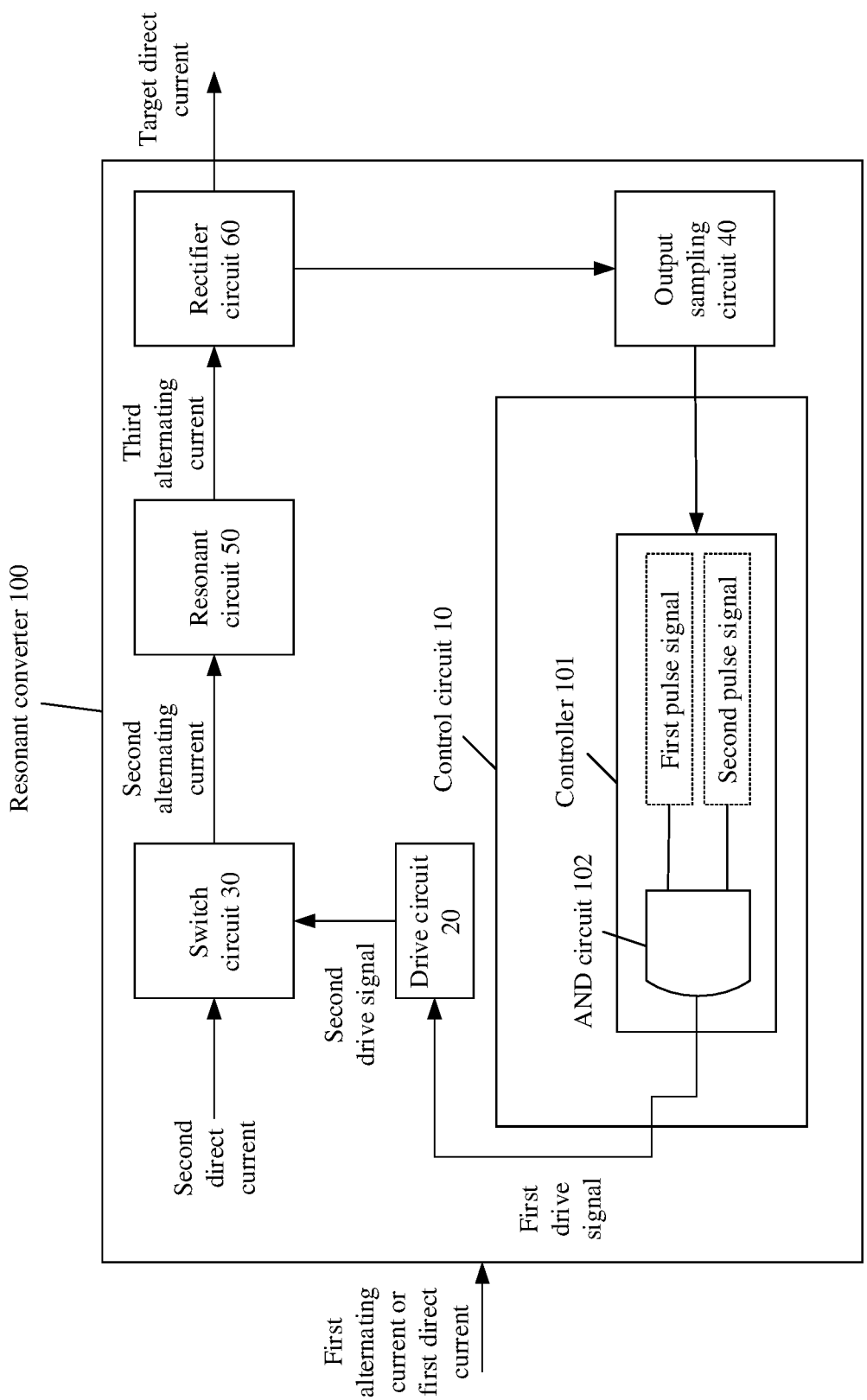
FIG. 6 is a schematic diagram of still yet another structure of a resonant converter.

FIG. 6 is a schematic diagram of still yet another structure of a resonant converter. As shown in FIG. 6, an AND circuit 102 may alternatively be included in a controller 101, that is, the AND circuit 102 and the controller 101 belong to a same electrical component. Herein, the AND circuit 102 is included in the controller 101, so that a size of the control circuit 10 can be reduced, thereby improving integration of the control circuit 10.

In some implementations, the switch circuit 30 may be a full-bridge inverter circuit, a half-bridge inverter circuit, a three-level inverter circuit, or another inverter circuit having an equivalent function. A structure of the switch circuit 30 is not limited.

In some implementations, the resonant circuit 50 may include components such as an inductor, a capacitor, and a transformer, and may be, for example, a common parallel LLC resonant tank network, a series LLC resonant tank network, or another resonant tank network having an equivalent function. A structure of the resonant circuit 50 is not limited.

In some implementations, the rectifier circuit 60 may be a full-bridge rectifier circuit, a half-bridge rectifier circuit, or another inverter circuit having an equivalent function. A structure of the rectifier circuit 60 is not limited.

In some implementations, the output sampling circuit 40 may be a voltage sampling circuit and/or a current sampling circuit in various forms. A structure of the output sampling circuit 40 is not limited.

In some implementations, the switch component may be an insulated gate bipolar transistor (IGBT), a metal-oxide-semiconductor field-effect transistor (MOSFET), a transistor, or the like. A type of the switch component is not limited.

In some implementations, the controller 101 in the embodiments may be a device that has a data processing and control function in any form, for example, a CPU, a general purpose processor, a DSP, an ASIC, an FPGA or another programmable logic device, a transistor logic device, a hardware component, or any combination thereof. This is not limited.

Embodiment 2

Figure 7:
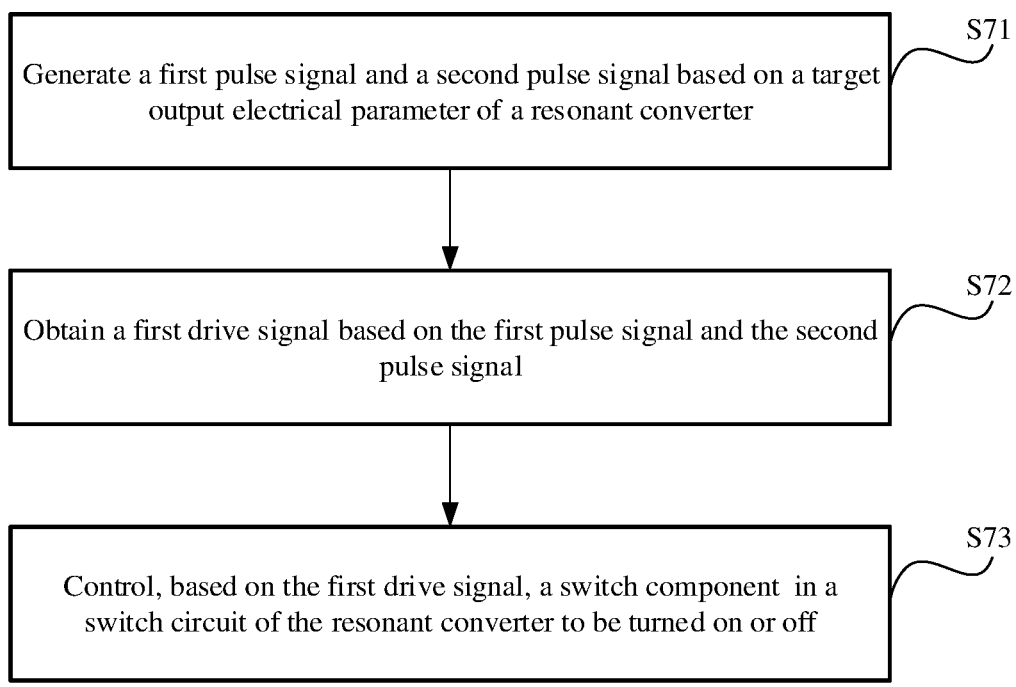
FIG. 7 is a schematic flowchart of a control method of a resonant converter.

FIG. 7 is a schematic flowchart of a control method of a resonant converter. The control method is applicable to the resonant converter 100 described in the foregoing Embodiment 1, and the control method is performed by the control circuit 10 in the resonant converter 100 described above. In this embodiment, for a structure and function implementation of the resonant converter 100, refer to the corresponding description in the foregoing Embodiment 1. Details are not described in this embodiment again. As shown in FIG. 7, the control method may include the following steps.

S71: Generate a first pulse signal and a second pulse signal based on a target output electrical parameter of the resonant converter.

In some implementations, after the resonant converter 100 is powered on and works, the control circuit 10 may first obtain a preset target output electrical parameter of the resonant converter 100. Then, the control circuit 10 may generate the first pulse signal and the second pulse signal based on the target output electrical parameter. A frequency of the first pulse signal is greater than a frequency of the second pulse signal. Herein, for a process in which the control circuit 10 generates the first pulse signal and the second pulse signal based on the target output electrical parameter, refer to the corresponding process described in the foregoing Embodiment 1. Details are not described herein again.

It should be understood that the electrical parameter may include a voltage or a current, and the target output electrical parameter is an output voltage value or an output current value preset by the resonant converter 100. When the target output electrical parameter is a preset output voltage value, the target direct current is a direct current whose voltage value is the preset output voltage value. When the target output electrical parameter is a preset output current value, the target direct current is a direct current whose current value is the preset output current value. Before the resonant converter 100 reaches a steady state, a direct current output by the resonant converter 100 is not the target direct current described above.

Optionally, the resonant converter 100 may include a controller 101 and an AND circuit 102, and the controller 101 and the AND circuit 102 form the control circuit 10 described above. In implementation, the control circuit 10 may generate the first pulse signal and the second pulse signal based on the target output electrical parameter of the resonant converter 100 by using the controller 101.

Further, the controller 101 and the AND circuit 102 may be independent of each other, or the AND circuit 102 may be included in the controller 101. This is not limited.

S72: Obtain a first drive signal based on the first pulse signal and the second pulse signal.

In some implementations, after generating the first pulse signal and the second pulse signal, the control circuit 10 may obtain the first drive signal based on the first pulse signal and the second pulse signal.

Optionally, the control circuit 10 may perform an AND operation on the first pulse signal and the second pulse signal to obtain the first drive signal.

Optionally, the control circuit 10 may perform an AND operation on the first pulse signal and the second pulse signal by using the AND circuit 102, to obtain the first drive signal.

S73: Control, based on the first drive signal, a switch component in a switch circuit of the resonant converter to be turned on or off.

In some implementations, after obtaining the first drive signal, the control circuit 10 may control, based on the first drive signal, the switch component in the switch circuit 30 of the resonant converter 100 to be turned on or off, so that the switch circuit 30 can convert a second direct current provided by the resonant converter 100 into a second alternating current and output the second alternating current. It should be understood that the second direct current herein may be the first direct current described above or may be obtained by converting the first direct current or the first alternating current described above. This is not limited.

After obtaining the first drive signal, the control circuit 10 may send the first drive signal to the drive circuit 20, to trigger the drive circuit 20 to convert the first drive signal into one or more second drive signals and send the one or more second drive signals to the switch circuit 30. In this case, the switch circuit 30 can turn on or off, based on the one or more second drive signals, one or more switch components included in the switch circuit 30. Herein, for a process in which the control circuit 10 controls the switch circuit 30 based on the drive circuit 20, refer to the corresponding process described in the foregoing Embodiment 1. Details are not described herein again.

In the foregoing implementation, the control circuit 10 may generate, based on the target output electrical parameter preset by the resonant converter 100, the first pulse signal and the second pulse signal that have frequencies and duty cycles, then perform an AND operation on the first pulse signal and the second pulse signal to obtain the first drive signal, and further drive, based on the first drive signal, the switch component in the switch circuit 30 to be turned on or off. Because the first drive signal is obtained by performing an AND operation on the first pulse signal and the second pulse signal, adjustable ranges for a frequency and a duty cycle of the first drive signal are relatively large. Therefore, the first drive signal is used to drive a switching transistor in the switch circuit 30 to be turned on or off, so that a gain adjustable range of the resonant converter 100 is relatively large. Therefore, according to the control method of the resonant converter 100, the resonant converter 100 can have a very small gain under a light-load or almost-no-load working condition, so that the resonant converter has a relatively low output ripple, and applicability and practicability of the resonant converter 100 can be significantly improved.

Figure 8:
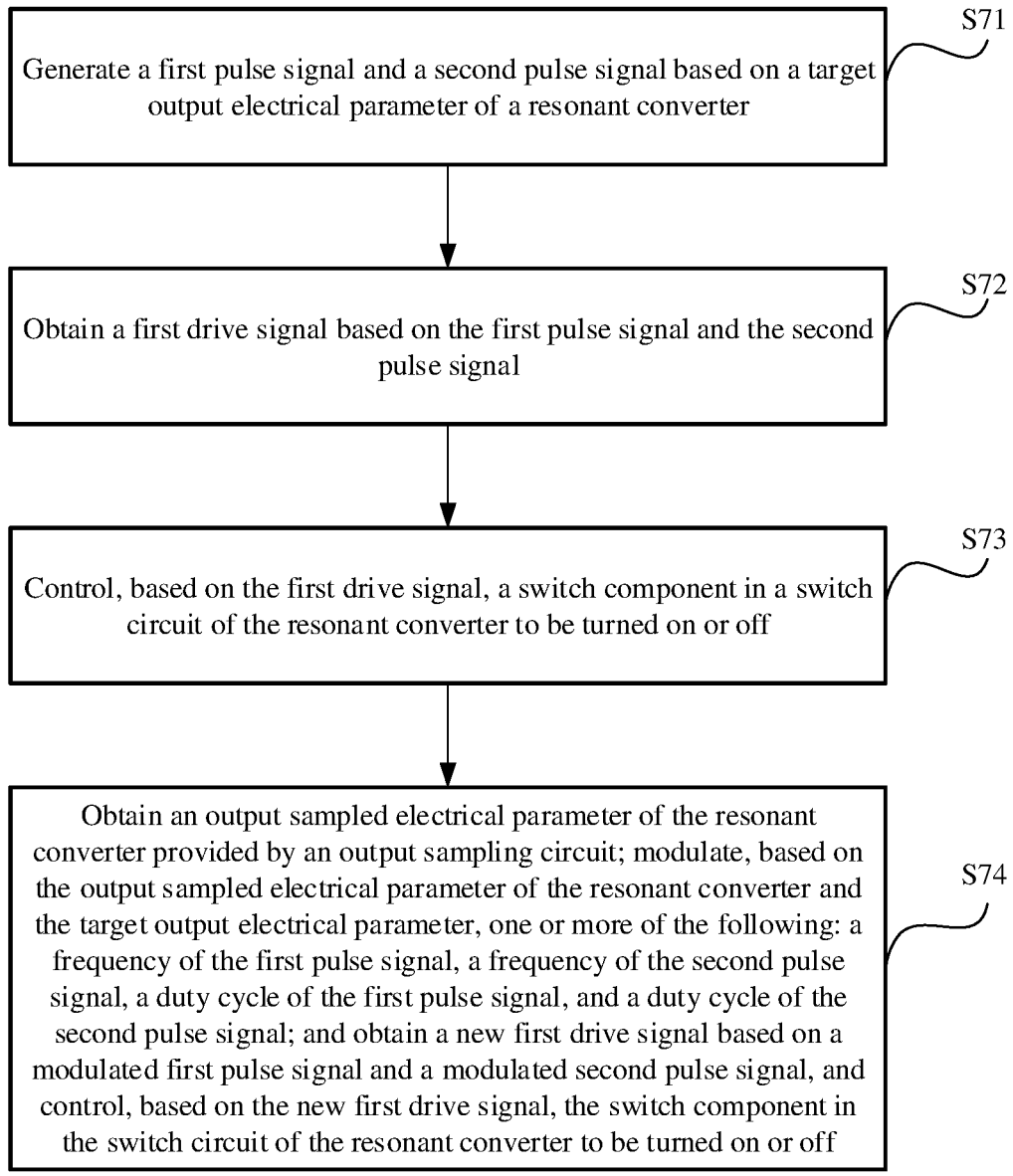
FIG. 8 is another schematic flowchart of a control method of a resonant converter.

FIG. 8 is still another schematic flowchart of a control method of a resonant converter. As shown in FIG. 8, the control method of the resonant converter may further include the following step.

S74: Obtain an output sampled electrical parameter of the resonant converter provided by an output sampling circuit; then modulate, based on the output sampled electrical parameter of the resonant converter and the target output electrical parameter, one or more of the following: a frequency of the first pulse signal, a frequency of the second pulse signal, a duty cycle of the first pulse signal, and a duty cycle of the second pulse signal; obtain a new first drive signal based on a modulated first pulse signal and a modulated second pulse signal, and control, based on the new first drive signal, the switch component in the switch circuit of the resonant converter to be turned on or off.

In some implementations, the resonant converter 100 may further include an output sampling circuit 40. After controlling, based on the first drive signal, the switch component in the switch circuit 30 to be on or off, the control circuit 10 may further obtain the output sampled electrical parameter of the resonant converter 100 provided by the output sampling circuit 40; then modulate, based on the output sampled electrical parameter of the resonant converter 100 and the target output electrical parameter, one or more of the following: the frequency of the first pulse signal, the frequency of the second pulse signal, the duty cycle of the first pulse signal, and the duty cycle of the second pulse signal; and obtain a new first drive signal based on the modulated first pulse signal and the modulated second pulse signal, and control, based on the new first drive signal, the switch component in the switch circuit 30 to be turned on or off. It should be understood that, when the target output electrical parameter is a preset output voltage value, the output sampling circuit 40 is configured to detect an output voltage of the resonant converter 100 and send the detected voltage value as the output sampled electrical parameter of the resonant converter 100 to the control circuit 10. When the target output electrical parameter is a preset output current value, the output sampling circuit 40 is configured to detect an output current of the resonant converter 100 and send the detected current value as the output sampled electrical parameter of the resonant converter 100 to the control circuit 10.

In the foregoing implementation, the control circuit 10 may continuously modulate, based on the output sampled electrical parameter of the resonant converter 100 provided by the output sampling circuit 40, one or more of the following: the frequency of the first pulse signal, the frequency of the second pulse signal, the duty cycle of the first pulse signal, and the duty cycle of the second pulse signal, to indirectly perform feedback and adjustment on a turn-on frequency and turn-on duration of the switch component in the switch circuit 30. Feedback and adjustment operations are repeated for a plurality of times, so that an actual output electrical parameter of the resonant converter 100 can be gradually consistent with the preset target output electrical parameter, to achieve a stable state.

In this embodiment, a gain of the resonant converter 100 is directly proportional to the duty cycle of the first pulse signal and/or the duty cycle of the second pulse signal and is inversely proportional to the frequency of the first pulse signal and/or the frequency of the second pulse signal.

Herein, there are multiple implementations in which the control circuit 10 modulates, based on the output sampled electrical parameter and the target output electrical parameter of the resonant converter 100, one or more of the following: the frequency of the first pulse signal, the frequency of the second pulse signal, the duty cycle of the first pulse signal, and the duty cycle of the second pulse signal. The following separately describes the implementations.

Manner 1

The control circuit 10 may obtain the modulated first pulse signal and the modulated second pulse signal by adjusting only the frequency of the first pulse signal.

After obtaining the output sampled electrical parameter of the resonant converter 100, the control circuit 10 may compare the output sampled electrical parameter with the preset target output electrical parameter. If the control circuit 10 determines that the output sampled electrical parameter of the resonant converter 100 is less than the target output electrical parameter, it indicates that the gain of the resonant converter 100 needs to be increased. In this case, the control circuit 10 may reduce the frequency of the first pulse signal and keep the duty cycle of the first pulse signal, the frequency of the second pulse signal, and the duty cycle of the second pulse signal unchanged, to obtain the modulated first pulse signal and the modulated second pulse signal. Herein, because the frequency of the first pulse signal is reduced, a frequency of the new first drive signal obtained by combining the modulated first pulse signal and the modulated second pulse signal is less than the frequency of the original first drive signal. In this way, the gain of the resonant converter 100 may be increased, so that a new output sampled electrical parameter of the resonant converter 100 can be closer to the target output electrical parameter.

Further, if the control circuit 10 determines that the output sampled electrical parameter of the resonant converter 100 is greater than the target output electrical parameter, it indicates that the gain of the resonant converter 100 needs to be reduced. In this case, the control circuit 10 may increase the frequency of the first pulse signal and keep the duty cycle of the first pulse signal, the frequency of the second pulse signal, and the duty cycle of the second pulse signal unchanged, to obtain the modulated first pulse signal and the modulated second pulse signal. Herein, because the frequency of the first pulse signal is increased, a frequency of the new first drive signal obtained by combining the modulated first pulse signal and the modulated second pulse signal is greater than the frequency of the original first drive signal. In this way, the gain of the resonant converter 100 may be reduced, so that a new output sampled electrical parameter of the resonant converter 100 can be closer to the target output electrical parameter.

Further, if the control circuit 10 determines that the output sampled electrical parameter of the resonant converter 100 is consistent with the target output electrical parameter, it indicates that the gain of the resonant converter 100 does not need to be changed. In this case, the control circuit 10 may keep the frequency of the first pulse signal, the duty cycle of the first pulse signal, the frequency of the second pulse signal, and the duty cycle of the second pulse signal unchanged, to obtain the modulated first pulse signal and the modulated second pulse signal.

It should be additionally noted that, when the control circuit 10 determines that the output sampled electrical parameter of the resonant converter 100 is consistent with the target output electrical parameter, the control circuit 10 may stop obtaining the output sampled electrical parameter of the resonant converter 100 provided by the output sampling circuit 40, and after detecting that a preset trigger condition is met, obtain a new output sampled electrical parameter of the resonant converter 100 provided by the output sampling circuit 40. There are multiple preset trigger conditions, for example: a preset triggering time period arrives, or the target output electrical parameter of the resonant converter 100 is reconfigured. This is not limited.

It should be additionally noted that, when the control circuit 10 determines that the output sampled electrical parameter of the resonant converter 100 is consistent with the target output electrical parameter, the control circuit 10 may obtain a new output sampled electrical parameter of the resonant converter 100, and repeatedly perform the foregoing determining and adjustment operations based on the new output sampled electrical parameter. Alternatively, the control circuit 10 may suspend obtaining the output sampled electrical parameter of the resonant converter 100 provided by the output sampling circuit 40, and detect, in real time, whether the preset trigger condition is met. If the control circuit detects that the preset trigger condition is met, the control circuit may start again to obtain an output sampled electrical parameter of the resonant converter 100 provided by the output sampling circuit 40. There are multiple preset trigger conditions, for example: a preset triggering time period arrives, or the target output electrical parameter of the resonant converter 100 is reconfigured. This is not limited.

Manner 2

The control circuit 10 may obtain the modulated first pulse signal and the modulated second pulse signal by adjusting only the duty cycle of the first pulse signal.

If the control circuit 10 determines that the output sampled electrical parameter of the resonant converter 100 is less than the target output electrical parameter after obtaining the output sampled electrical parameter of the resonant converter 100, it indicates that the gain of the resonant converter 100 needs to be increased. In this case, the control circuit 10 may increase the duty cycle of the first pulse signal and keep the frequency of the first pulse signal, the frequency of the second pulse signal, and the duty cycle of the second pulse signal unchanged, to obtain the modulated first pulse signal and the modulated second pulse signal. Herein, because the duty cycle of the first pulse signal is increased, a duty cycle of the new first drive signal obtained by combining the modulated first pulse signal and the modulated second pulse signal is greater than the duty cycle of the original first drive signal. In this way, the gain of the resonant converter 100 may be increased, so that a new output sampled electrical parameter of the resonant converter 100 can be closer to the target output electrical parameter.

Further, if the control circuit 10 determines that the output sampled electrical parameter of the resonant converter 100 is greater than the target output electrical parameter, it indicates that the gain of the resonant converter 100 needs to be reduced. In this case, the control circuit 10 may reduce the duty cycle of the first pulse signal and keep the duty cycle of the first pulse signal, the frequency of the second pulse signal, and the duty cycle of the second pulse signal unchanged, to obtain the modulated first pulse signal and the modulated second pulse signal. Herein, because the duty cycle of the first pulse signal is reduced, a duty cycle of the new first drive signal obtained by combining the modulated first pulse signal and the modulated second pulse signal is less than the duty cycle of the original first drive signal. In this way, the gain of the resonant converter 100 may be reduced, so that a new output sampled electrical parameter of the resonant converter 100 can be closer to the target output electrical parameter.

Further, if the control circuit 10 determines that the output sampled electrical parameter of the resonant converter 100 is consistent with the target output electrical parameter, it indicates that the gain of the resonant converter 100 does not need to be changed. In this case, the control circuit 10 may keep the frequency of the first pulse signal, the duty cycle of the first pulse signal, the frequency of the second pulse signal, and the duty cycle of the second pulse signal unchanged, to obtain the modulated first pulse signal and the modulated second pulse signal.

Manner 3

The control circuit 10 may obtain the modulated first pulse signal and the modulated second pulse signal by adjusting only the duty cycle and the frequency of the first pulse signal.

If the control circuit 10 determines that the output sampled electrical parameter of the resonant converter 100 is less than the target output electrical parameter after obtaining the output sampled electrical parameter of the resonant converter 100, it indicates that the gain of the resonant converter 100 needs to be increased. In this case, the control circuit 10 may increase the duty cycle of the first pulse signal, reduce the frequency of the first pulse signal, and keep the frequency of the second pulse signal and the duty cycle of the second pulse signal unchanged, to obtain the modulated first pulse signal and the modulated second pulse signal.

Further, if the control circuit 10 determines that the output sampled electrical parameter of the resonant converter 100 is greater than the target output electrical parameter, it indicates that the gain of the resonant converter 100 needs to be reduced. In this case, the control circuit 10 may reduce the duty cycle of the first pulse signal, increase the duty cycle of the first pulse signal, and keep the frequency of the second pulse signal and the duty cycle of the second pulse signal unchanged, to obtain the modulated first pulse signal and the modulated second pulse signal.

Further, if the control circuit 10 determines that the output sampled electrical parameter of the resonant converter 100 is consistent with the target output electrical parameter, it indicates that the gain of the resonant converter 100 does not need to be changed. In this case, the control circuit 10 may keep the frequency of the first pulse signal, the duty cycle of the first pulse signal, the frequency of the second pulse signal, and the duty cycle of the second pulse signal unchanged, to obtain the modulated first pulse signal and the modulated second pulse signal.

Manner 4

The control circuit 10 may obtain the modulated first pulse signal and the modulated second pulse signal by adjusting only the frequency of the second pulse signal.

After obtaining the output sampled electrical parameter of the resonant converter 100, the control circuit 10 may compare the output sampled electrical parameter with the preset target output electrical parameter. If the control circuit 10 determines that the output sampled electrical parameter of the resonant converter 100 is less than the target output electrical parameter, it indicates that the gain of the resonant converter 100 needs to be increased. In this case, the control circuit 10 may reduce the frequency of the second pulse signal and keep the duty cycle of the second pulse signal, the frequency of the first pulse signal, and the duty cycle of the first pulse signal unchanged, to obtain the modulated first pulse signal and the modulated second pulse signal. Herein, because the frequency of the second pulse signal is reduced, a frequency of the new first drive signal obtained by combining the modulated first pulse signal and the modulated second pulse signal is less than the frequency of the original first drive signal. In this way, the gain of the resonant converter 100 may be increased, so that a new output sampled electrical parameter of the resonant converter 100 can be closer to the target output electrical parameter.

Further, if the control circuit 10 determines that the output sampled electrical parameter of the resonant converter 100 is greater than the target output electrical parameter, it indicates that the gain of the resonant converter 100 needs to be reduced. In this case, the control circuit 10 may increase the frequency of the second pulse signal and keep the duty cycle of the second pulse signal, the frequency of the first pulse signal, and the duty cycle of the first pulse signal unchanged, to obtain the modulated first pulse signal and the modulated second pulse signal. Herein, because the frequency of the second pulse signal is increased, a frequency of the new first drive signal obtained by combining the modulated first pulse signal and the modulated second pulse signal is greater than the frequency of the original first drive signal. In this way, the gain of the resonant converter 100 may be reduced, so that a new output sampled electrical parameter of the resonant converter 100 can be closer to the target output electrical parameter.

Further, if the control circuit 10 determines that the output sampled electrical parameter of the resonant converter 100 is consistent with the target output electrical parameter, it indicates that the gain of the resonant converter 100 does not need to be changed. In this case, the control circuit 10 may keep the frequency of the first pulse signal, the duty cycle of the first pulse signal, the frequency of the second pulse signal, and the duty cycle of the second pulse signal unchanged, to obtain the modulated first pulse signal and the modulated second pulse signal.

Manner 5

The control circuit 10 may obtain the modulated first pulse signal and the modulated second pulse signal by adjusting only the duty cycle of the second pulse signal.

If the control circuit 10 determines that the output sampled electrical parameter of the resonant converter 100 is less than the target output electrical parameter after obtaining the output sampled electrical parameter of the resonant converter 100, it indicates that the gain of the resonant converter 100 needs to be increased. In this case, the control circuit 10 may increase the duty cycle of the second pulse signal and keep the frequency of the second pulse signal, the frequency of the first pulse signal, and the duty cycle of the first pulse signal unchanged, to obtain the modulated first pulse signal and the modulated second pulse signal. Herein, because the duty cycle of the second pulse signal is increased, a duty cycle of the new first drive signal obtained by combining the modulated first pulse signal and the modulated second pulse signal is greater than the duty cycle of the original first drive signal. In this way, the gain of the resonant converter 100 may be increased, so that a new output sampled electrical parameter of the resonant converter 100 can be closer to the target output electrical parameter.

Further, if the control circuit 10 determines that the output sampled electrical parameter of the resonant converter 100 is greater than the target output electrical parameter, it indicates that the gain of the resonant converter 100 needs to be reduced. In this case, the control circuit 10 may reduce the duty cycle of the second pulse signal and keep the duty cycle of the second pulse signal, the frequency of the first pulse signal, and the duty cycle of the first pulse signal unchanged, to obtain the modulated first pulse signal and the modulated second pulse signal. Herein, because the duty cycle of the second pulse signal is reduced, a duty cycle of the new first drive signal obtained by combining the modulated first pulse signal and the modulated second pulse signal is less than the duty cycle of the original first drive signal. In this way, the gain of the resonant converter 100 may be reduced, so that a new output sampled electrical parameter of the resonant converter 100 can be closer to the target output electrical parameter.

Further, if the control circuit 10 determines that the output sampled electrical parameter of the resonant converter 100 is consistent with the target output electrical parameter, it indicates that the gain of the resonant converter 100 does not need to be changed. In this case, the control circuit 10 may keep the frequency of the first pulse signal, the duty cycle of the first pulse signal, the frequency of the second pulse signal, and the duty cycle of the second pulse signal unchanged, to obtain the modulated first pulse signal and the modulated second pulse signal.

Manner 6

The control circuit 10 may obtain the modulated first pulse signal and the modulated second pulse signal by adjusting only the duty cycle and the frequency of the second pulse signal.

If the control circuit 10 determines that the output sampled electrical parameter of the resonant converter 100 is less than the target output electrical parameter after obtaining the output sampled electrical parameter of the resonant converter 100, it indicates that the gain of the resonant converter 100 needs to be increased. In this case, the control circuit 10 may increase the duty cycle of the second pulse signal, reduce the frequency of the second pulse signal, and keep the frequency of the first pulse signal and the duty cycle of the first pulse signal unchanged, to obtain the modulated first pulse signal and the modulated second pulse signal.

Further, if the control circuit 10 determines that the output sampled electrical parameter of the resonant converter 100 is greater than the target output electrical parameter, it indicates that the gain of the resonant converter 100 needs to be reduced. In this case, the control circuit 10 may reduce the duty cycle of the second pulse signal, increase the duty cycle of the second pulse signal, and keep the frequency of the first pulse signal and the duty cycle of the first pulse signal unchanged, to obtain the modulated first pulse signal and the modulated second pulse signal.

Further, if the control circuit 10 determines that the output sampled electrical parameter of the resonant converter 100 is consistent with the target output electrical parameter, it indicates that the gain of the resonant converter 100 does not need to be changed. In this case, the control circuit 10 may keep the frequency of the first pulse signal, the duty cycle of the first pulse signal, the frequency of the second pulse signal, and the duty cycle of the second pulse signal unchanged, to obtain the modulated first pulse signal and the modulated second pulse signal.

Manner 7

If the control circuit 10 determines that the output sampled electrical parameter of the resonant converter 100 is greater than the target output electrical parameter and further determines that the frequency of the first pulse signal is less than a first preset frequency after obtaining the output sampled electrical parameter of the resonant converter 100, the control circuit 10 may increase the frequency of the first pulse signal and keep the duty cycle of the first pulse signal, the frequency of the second pulse signal, and the duty cycle of the second pulse signal unchanged, to obtain the modulated first pulse signal and the modulated second pulse signal.

Further, if it is determined that the output sampled electrical parameter of the resonant converter 100 is greater than the target output electrical parameter and it is further determined that the frequency of the first pulse signal is greater than or equal to the first preset frequency, the control circuit 10 increases the frequency of the second pulse signal and keeps the frequency of the first pulse signal, the duty cycle of the first pulse signal, and the duty cycle of the second pulse signal unchanged, to obtain the modulated first pulse signal and the modulated second pulse signal. Alternatively, the control circuit 10 reduces the duty cycle of the second pulse signal and keeps the frequency of the first pulse signal, the duty cycle of the first pulse signal, and the frequency of the second pulse signal unchanged, to obtain the modulated first pulse signal and the modulated second pulse signal.

Further, if it is determined that the output sampled electrical parameter of the resonant converter 100 is less than the target output electrical parameter and it is further determined that the frequency of the first pulse signal is greater than a second preset frequency, the control circuit 10 may reduce the frequency of the first pulse signal and keep the duty cycle of the first pulse signal, the frequency of the second pulse signal, and the duty cycle of the second pulse signal unchanged, to obtain the modulated first pulse signal and the modulated second pulse signal.

Further, if it is determined that the output sampled electrical parameter of the resonant converter 100 is less than the target output electrical parameter and it is further determined that the frequency of the first pulse signal is less than or equal to the second preset frequency, the control circuit 10 may reduce the frequency of the second pulse signal and keep the frequency of the first pulse signal, the duty cycle of the first pulse signal, and the duty cycle of the second pulse signal unchanged, or increase the duty cycle of the second pulse signal and keep the frequency of the first pulse signal, the duty cycle of the first pulse signal, and the frequency of the second pulse signal unchanged, to obtain the modulated first pulse signal and the modulated second pulse signal.

Further, if it is determined that the output sampled electrical parameter of the resonant converter 100 is consistent with the target output electrical parameter, the control circuit 10 keeps the frequency of the first pulse signal, the duty cycle of the first pulse signal, the frequency of the second pulse signal, and the duty cycle of the second pulse signal unchanged.

It should be additionally noted that, in this embodiment, that the output sampled electrical parameter is consistent with the target output electrical parameter may mean that the difference between the output sampled electrical parameter and the target output electrical parameter is less than or equal to a first preset difference. That the output sampled electrical parameter is greater than the target output electrical parameter may mean that the output sampled electrical parameter is greater than the target output electrical parameter, and the difference between the output sampled electrical parameter and the target output electrical parameter is greater than the first preset difference. That the output sampled electrical parameter is less than the target output electrical parameter may mean that the output sampled electrical parameter is less than the target output electrical parameter, and the difference between the output sampled electrical parameter and the target output electrical parameter is greater than the first preset difference. Similarly, that the frequency of the first pulse signal is less than the first preset frequency may mean that the frequency of the first pulse signal is less than the first preset frequency, and the difference between the frequency of the first pulse signal and the first preset frequency is greater than a second preset difference. That the frequency of the first pulse signal is greater than the first preset frequency may mean that the frequency of the first pulse signal is greater than the first preset frequency, and the difference between the frequency of the first pulse signal and the first preset frequency is greater than the second preset difference. That the frequency of the first pulse signal is equal to the first preset frequency may mean that the difference between the frequency of the first pulse signal and the first preset frequency is less than or equal to the second preset difference. Similarly, that the frequency of the first pulse signal is less than the second preset frequency may mean that the frequency of the first pulse signal is less than the second preset frequency, and the difference between the frequency of the first pulse signal and the first preset frequency is greater than a third preset difference. That the frequency of the first pulse signal is greater than the second preset frequency may mean that the frequency of the first pulse signal is greater than the second preset frequency, and the difference between the frequency of the first pulse signal and the first preset frequency is greater than the third preset difference. That the frequency of the first pulse signal is equal to the second preset frequency may mean that the difference between the frequency of the first pulse signal and the second preset frequency is less than or equal to the third preset difference.

In the foregoing implementation, when a gain of the resonant converter 100 needs to be increased or reduced, the control circuit 10 uses a policy of preferentially reducing the frequency of the first pulse signal, and further modulates the frequency and the duty cycle of the second pulse signal only when it is determined that the frequency of the first pulse signal reaches an adjustable limit. Such a control manner is simple and reliable and a performance limitation of the control circuit 10 is full considered, to avoid a case in which the first pulse signal and the second pulse signal cannot be accurately modulated due to the performance limitation of the control circuit 10 and ensure continuity and monotonicity of gain adjustment of the resonant converter 100.

It should be understood that, in some optional implementations, the control circuit 10 may adjust the frequencies and/or the duty cycles of both the first pulse signal and the second pulse signal based on the output sampled electrical parameter of the resonant converter 100 and the target output electrical parameter, to obtain the modulated first pulse signal and the modulated second pulse signal. A modulation process is also similar to that in the foregoing six optional implementations, and the only difference lies in different adjustment objects. To avoid repetition, details are not described herein again.

In some implementations, the control circuit 10 may reduce or increase the frequency of the first pulse signal, the frequency of the second pulse signal, the duty cycle of the first pulse signal, or the duty cycle of the second pulse signal by a preset step value. For example, it is assumed that a step value corresponding to the frequency of the first pulse signal is df1. When the control circuit 10 determines to increase the frequency of the first pulse signal, the control circuit 10 may increase the frequency of the first pulse signal by the step value df1. When the control circuit 10 determines to reduce the frequency of the first pulse signal, the control circuit 10 may reduce the frequency of the first pulse signal by the step value df1. The other three cases are similar thereto, and details are not described herein again. Additionally, the control circuit 10 may alternatively reduce or increase the frequency of the first pulse signal, the frequency of the second pulse signal, the duty cycle of the first pulse signal, or the duty cycle of the second pulse signal in another manner. This is not limited.

In some implementations, the resonant converter 100 may include a controller 101 and an AND circuit 102, and the controller 101 and the AND circuit 102 form the control circuit 10 described above. In actual implementation, the control circuit 10 may generate the first pulse signal and the second pulse signal based on the target output electrical parameter of the resonant converter 100 by using the controller 101 and perform an AND operation on the first pulse signal and the second pulse signal by using the AND circuit, to obtain the first drive signal.

In the control method of the resonant converter 100 provided in this embodiment, the control circuit 10 may generate, based on the target output electrical parameter preset by the resonant converter 100, the first pulse signal and the second pulse signal that have frequencies and duty cycles, then perform an AND operation on the first pulse signal and the second pulse signal to obtain the first drive signal, and further drive, based on the first drive signal, the switch component in the switch circuit 30 to be turned on or off. Because the first drive signal is obtained by performing an AND operation on the first pulse signal and the second pulse signal, adjustable ranges for a frequency and a duty cycle of the first drive signal are relatively large. Therefore, the gain of the resonant converter 100 is adjusted by adjusting the frequency and the duty cycle of the first drive signal, so that a gain adjustable range of the resonant converter 100 is relatively large. Therefore, according to the control method of the resonant converter 100, the resonant converter 100 can have a very small gain under a light-load or almost-no-load working condition, so that the resonant converter has a relatively low output ripple, and applicability and practicability of the resonant converter 100 can be significantly improved.

An embodiment further provides a control circuit of a resonant converter. The control circuit may be applicable to the resonant converter 100 described above and may be the control circuit 10 described above. The control circuit may be configured to generate a first pulse signal and a second pulse signal based on a target output electrical parameter of the resonant converter. A frequency of the first pulse signal is greater than or equal to a frequency of the second pulse signal. The control circuit is further configured to: obtain a first drive signal based on the first pulse signal and the second pulse signal, and control, based on the first drive signal, a switch component in a switch circuit of the resonant converter to be turned on or off. Herein, for descriptions of a structure and functions of the control circuit, refer to the descriptions of the structure and the functions of the control circuit 10 in Embodiment 1 and Embodiment 2. Details are not described herein again.

Figure 9:
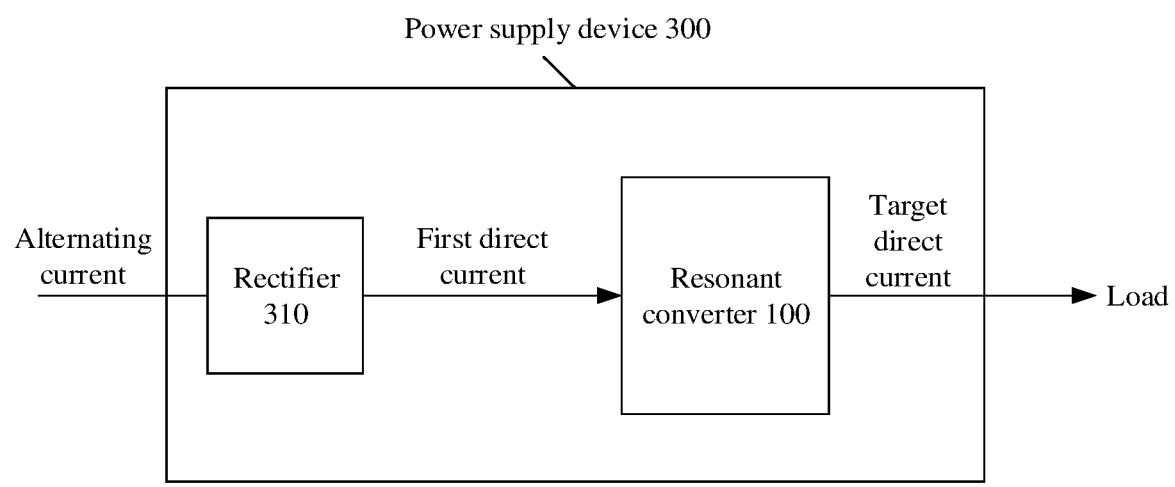
FIG. 9 is a schematic diagram of a structure of a power supply device.

An embodiment further provides a power supply device. FIG. 9 is a schematic diagram of a structure of a power supply device. The power supply device 300 may include a rectifier 310 and the resonant converter 100 described in the foregoing Embodiment 1. The rectifier 310 is coupled to the resonant converter 100.

In actual operation, the rectifier 310 is configured to: convert an alternating current externally connected to the power supply device 300 into a first direct current and provide the first direct current to the resonant converter 100. The resonant converter 100 is configured to: convert the first direct current into a target direct current and provide the target direct current to a load externally connected to the power supply device 300.

Optionally, the alternating current may be provided by an alternating current power supply externally connected to the power supply device 300, and the alternating current power supply externally connected to the power supply device 300 may be an alternating current power supply in any form, such as a solar panel, a photovoltaic panel, or a power grid.

Optionally, the load externally connected to the power supply device 300 may be a household appliance (such as a washing machine or a refrigerator), a smart electric vehicle, a data center server, or the like.

Optionally, the power supply device 300 may be a device such as a charging pile or a power supply box.

Figure 10:
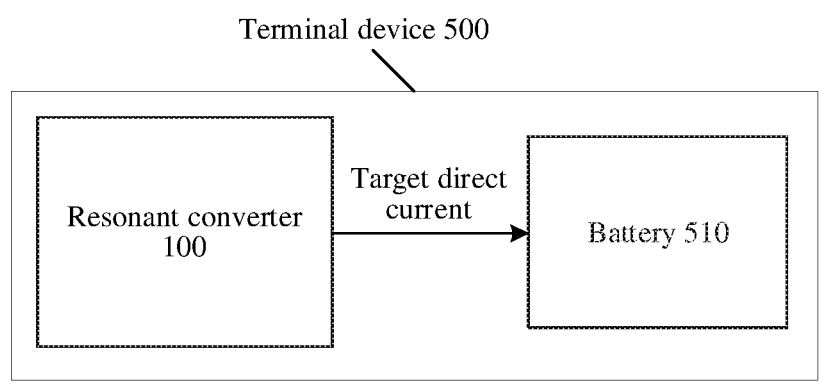
FIG. 10 is a schematic diagram of a structure of a terminal device.

FIG. 10 is a schematic diagram of a structure of a terminal device. As shown in FIG. 10, the terminal device 500 includes the resonant converter 100 described above and a battery 510. The resonant converter 100 is connected to the battery 510. The resonant converter 100 is configured to: obtain a target direct current through conversion and charge the battery 510 by using the target direct current. It should be noted that the terminal device 500 may be a smartphone, a tablet computer, a smart speaker, a wearable device, or the like.

In an optional implementation, when power of the terminal device 500 is insufficient, the resonant converter 100 converts a first direct current or a first alternating current received by the resonant converter 100 into a target direct current having an operating voltage required by the terminal device 500, and outputs the target direct current to the battery 510, so as to charge the battery 510.

In embodiments, it should be understood that the systems, apparatuses, or methods may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in the embodiments may be integrated into one processing unit, each of the units may exist alone physically, or two or more units are integrated into one unit.

In the embodiments and accompanying drawings, the terms "first", "second", "third", "fourth", and the like are used to distinguish between different objects and are not used to describe a particular order. In addition, the terms "including," "having," and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

An "embodiment" means that a particular characteristic, structure, or feature described with reference to embodiments may be included in at least one embodiment. The phrase may not necessarily refer to a same embodiment and is not an independent or optional embodiment exclusive from another embodiment. It is explicitly and implicitly understood by a person skilled in the art that any embodiments described may be combined with another embodiment.

In the foregoing implementations, the objectives, the solutions, and the beneficial effects are further described in detail. It should be understood that the foregoing descriptions are merely implementations but are not intended to limit the scope of the embodiments. Any modification, equivalent replacement, improvement, or the like shall fall within the scope of the embodiments.

What is claimed is:

1. A resonant converter, comprising:
   a control circuit, a drive circuit, and a switch circuit, and the control circuit is connected to the switch circuit through the drive circuit; and
   the control circuit is configured to:
   generate a first pulse signal and a second pulse signal based on a target output electrical parameter of the resonant converter, wherein a frequency of the first pulse signal is greater than or equal to a frequency of the second pulse signal; and
   obtain a first drive signal based on the first pulse signal and the second pulse signal, and send the first drive signal to the drive circuit;
   the drive circuit is configured to:
   convert the first drive signal into one or more second drive signals, and send the one or more second drive signals to the switch circuit; and
   the switch circuit is configured to:
   turn on or off a switch component in the switch circuit based on the one or more second drive signals.

2. The resonant converter according to claim 1, wherein the resonant converter further comprises an output sampling circuit, and the output sampling circuit is connected to the control circuit; and
   the control circuit is further configured to:
   obtain an output sampled electrical parameter of the resonant converter provided by the output sampling circuit;
   modulate, based on the output sampled electrical parameter of the resonant converter and the target output electrical parameter, one or more of the following: the frequency of the first pulse signal, the frequency of the second pulse signal, a duty cycle of the first pulse signal, and a duty cycle of the second pulse signal;
   obtain a new first drive signal based on a modulated first pulse signal and a modulated second pulse signal; and
   send the new first drive signal to the drive circuit.

3. The resonant converter according to claim 2, wherein the control circuit is further configured to:

determine that the output sampled electrical parameter of the resonant converter is greater than the target output electrical parameter and the frequency of the first pulse signal is less than a first preset frequency; and increase the frequency of the first pulse signal and keep the duty cycle of the first pulse signal, the frequency of the second pulse signal, and the duty cycle of the second pulse signal unchanged, to obtain the modulated first pulse signal and the modulated second pulse signal.

4. The resonant converter according to claim 2, wherein the control circuit is further configured to:

determine that the output sampled electrical parameter of the resonant converter is greater than the target output electrical parameter and the frequency of the first pulse signal is greater than or equal to the first preset frequency; and increase the frequency of the second pulse signal and keep the frequency of the first pulse signal, the duty cycle of the first pulse signal, and the duty cycle of the second pulse signal unchanged; or reduce the duty cycle of the second pulse signal and keep the frequency of the first pulse signal, the duty cycle of the first pulse signal, and the frequency of the second pulse signal unchanged, to obtain the modulated first pulse signal and the modulated second pulse signal.

5. The resonant converter according to claim 2, wherein the control circuit is further configured to:

determine that the output sampled electrical parameter of the resonant converter is less than the target output electrical parameter and the frequency of the first pulse signal is greater than a second preset frequency; and reduce the frequency of the first pulse signal and keep the duty cycle of the first pulse signal, the frequency of the second pulse signal, and the duty cycle of the second pulse signal unchanged.

6. The resonant converter according to claim 2, wherein the control circuit is further configured to:

determine that the output sampled electrical parameter of the resonant converter is less than the target output electrical parameter and the frequency of the first pulse signal is less than or equal to the second preset frequency; and reduce the frequency of the second pulse signal and keep the frequency of the first pulse signal, the duty cycle of the first pulse signal, and the duty cycle of the second pulse signal unchanged; or increase the duty cycle of the second pulse signal and keep the frequency of the first pulse signal, the duty cycle of the first pulse signal, and the frequency of the second pulse signal unchanged, to obtain the modulated first pulse signal and the modulated second pulse signal.

7. The resonant converter according to claim 2, wherein the control circuit is further configured to:

determine that the output sampled electrical parameter of the resonant converter is consistent with the target output electrical parameter; and keep the frequency of the first pulse signal, the duty cycle of the first pulse signal, the frequency of the second pulse signal, and the duty cycle of the second pulse signal unchanged.

8. The resonant converter according to claim 2, wherein the resonant converter further comprises a resonant circuit and a rectifier circuit, the resonant circuit is connected to the switch circuit and the rectifier circuit, and the rectifier circuit is connected to the control circuit through the output sampling circuit.

9. The resonant converter according to claim 2, wherein a gain of the resonant converter is directly proportional to the duty cycle of the first pulse signal and/or the duty cycle of the second pulse signal and is inversely proportional to the frequency of the first pulse signal and/or the frequency of the second pulse signal.

10. The resonant converter according to claim 2, wherein the control circuit comprises a controller and an AND circuit, wherein the controller is further configured to generate the first pulse signal and the second pulse signal based on the target output electrical parameter of the resonant converter; and the AND circuit is configured to:

perform an AND operation on the first pulse signal and the second pulse signal to obtain the first drive signal, and send the first drive signal to the drive circuit.

11. A control method of a resonant converter, comprising:

generating a first pulse signal and a second pulse signal based on a target output electrical parameter of the resonant converter, wherein a frequency of the first pulse signal is greater than or equal to a frequency of the second pulse signal; and obtaining a first drive signal based on the first pulse signal and the second pulse signal, and controlling, based on the first drive signal, a switch component in a switch circuit of the resonant converter to be turned on or off.

12. The control method according to claim 11, wherein the resonant converter further comprises an output sampling circuit, and the method further comprises:

obtaining an output sampled electrical parameter of the resonant converter provided by the output sampling circuit;

modulating, based on the output sampled electrical parameter of the resonant converter and the target output electrical parameter, one or more of the following: the frequency of the first pulse signal, the frequency of the second pulse signal, a duty cycle of the first pulse signal, and a duty cycle of the second pulse signal; and obtaining a new first drive signal based on a modulated first pulse signal and a modulated second pulse signal, and controlling, based on the new first drive signal, the switch component in the switch circuit of the resonant converter to be turned on or off.

13. The control method according to claim 12, wherein modulating, based on the output sampled electrical parameter of the resonant converter and the target output electrical parameter, one or more of the following: the frequency of the first pulse signal, the frequency of the second pulse signal, the duty cycle of the first pulse signal, and the duty cycle of the second pulse signal further comprises:

determining that the output sampled electrical parameter of the resonant converter is greater than the target output electrical parameter and the frequency of the first pulse signal is less than a first preset frequency, increasing the frequency of the first pulse signal and keeping the duty cycle of the first pulse signal, the frequency of the second pulse signal, and the duty cycle of the second pulse signal unchanged.

14. The control method according to claim 12, wherein modulating, based on the output sampled electrical parameter of the resonant converter and the target output electrical parameter, one or more of the following: the frequency of the first pulse signal, the frequency of the second pulse signal, the duty cycle of the first pulse signal, and the duty cycle of the second pulse signal further comprises:
- determining that the output sampled electrical parameter of the resonant converter is greater than the target output electrical parameter and the frequency of the first pulse signal is greater than or equal to the first preset frequency,
- increasing the frequency of the second pulse signal and keeping the frequency of the first pulse signal, the duty cycle of the first pulse signal, and the duty cycle of the second pulse signal unchanged, or
- reducing the duty cycle of the second pulse signal and keeping the frequency of the first pulse signal, the duty cycle of the first pulse signal, and the frequency of the second pulse signal unchanged.

15. The control method according to claim 12, wherein the modulating, based on the output sampled electrical parameter of the resonant converter and the target output electrical parameter, one or more of the following: the frequency of the first pulse signal, the frequency of the second pulse signal, the duty cycle of the first pulse signal, and the duty cycle of the second pulse signal further comprises:
- determining that the output sampled electrical parameter of the resonant converter is less than the target output electrical parameter and the frequency of the first pulse signal is greater than a second preset frequency,
- reducing the frequency of the first pulse signal and keeping the duty cycle of the first pulse signal, the frequency of the second pulse signal, and the duty cycle of the second pulse signal unchanged.

16. The control method according to claim 12, wherein modulating, based on the output sampled electrical parameter of the resonant converter and the target output electrical parameter, one or more of the following: the frequency of the first pulse signal, the frequency of the second pulse signal, the duty cycle of the first pulse signal, and the duty cycle of the second pulse signal further comprises:
- determining that the output sampled electrical parameter of the resonant converter is less than the target output electrical parameter and the frequency of the first pulse signal is less than or equal to the second preset frequency,
- reducing the frequency of the second pulse signal and keeping the frequency of the first pulse signal, the duty cycle of the first pulse signal, and the duty cycle of the second pulse signal unchanged, or
- increasing the duty cycle of the second pulse signal and keeping the frequency of the first pulse signal, the duty cycle of the first pulse signal, and the frequency of the second pulse signal unchanged.

17. The control method according to claim 12, wherein modulating, based on the output sampled electrical parameter of the resonant converter and the target output electrical parameter, one or more of the following: the frequency of the first pulse signal, the frequency of the second pulse signal, the duty cycle of the first pulse signal, and the duty cycle of the second pulse signal further comprises:
- determining that the output sampled electrical parameter of the resonant converter is consistent with the target output electrical parameter, and
keeping the frequency of the first pulse signal, the duty cycle of the first pulse signal, the frequency of the second pulse signal, and the duty cycle of the second pulse signal unchanged.

18. The control method according to claim 12, wherein a gain of the resonant converter is directly proportional to the duty cycle of the first pulse signal and/or the duty cycle of the second pulse signal, and is inversely proportional to the frequency of the first pulse signal and/or the frequency of the second pulse signal.

19. A power supply device, comprising:
a rectifier and a resonant converter;
the rectifier is configured to:
convert an alternating current externally connected to the power supply device into a first direct current, and
provide the first direct current to the resonant converter; and
the resonant converter is configured to:
convert the first direct current into a target direct current, and
provide the target direct current to a load of the power supply device;
the resonant converter comprises a control circuit, a drive circuit, and a switch circuit, and the control circuit is connected to the switch circuit through the drive circuit;
the control circuit is configured to:
generate a first pulse signal and a second pulse signal based on a target output electrical parameter of the resonant converter, wherein a frequency of the first pulse signal is greater than or equal to a frequency of the second pulse signal;
obtain a first drive signal based on the first pulse signal and the second pulse signal, and send the first drive signal to the drive circuit;
the drive circuit is configured to:
convert the first drive signal into one or more second drive signals, and
send the one or more second drive signals to the switch circuit; and
the switch circuit is configured to turn on or off a switch component in the switch circuit based on the one or more second drive signals.

20. The power supply device according to claim 19, wherein the resonant converter further comprises an output sampling circuit, and the output sampling circuit is connected to the control circuit; and
the control circuit is configured to:
obtain an output sampled electrical parameter of the resonant converter provided by the output sampling circuit;
modulate, based on the output sampled electrical parameter of the resonant converter and the target output electrical parameter, one or more of the following: the frequency of the first pulse signal, the frequency of the second pulse signal, a duty cycle of the first pulse signal, and a duty cycle of the second pulse signal;
obtain a new first drive signal based on a modulated first pulse signal and a modulated second pulse signal; and
send the new first drive signal to the drive circuit.

* * * * *